US009829629B2

(12) United States Patent
Horth et al.

(10) Patent No.: US 9,829,629 B2
(45) Date of Patent: Nov. 28, 2017

(54) METHODS AND SYSTEMS RELATING TO OPTICAL WAVEGUIDE TAPERS

(71) Applicant: THE ROYAL INSTITUTION FOR THE ADVANCEMENT OF LEARNING / MCGILL UNIVERSITY, Montreal (CA)

(72) Inventors: Alexandre Horth, Montreal (CA); Nathaniel Quitoriano, Montreal (CA)

(73) Assignee: THE ROYAL INSTITUTION FOR THE ADVANCEMENT OF LEARNING/MCGILL UNIVERSITY, Montreal (CA)

(*) Notice: Subject to any disclaimer, the term of this patent is extended or adjusted under 35 U.S.C. 154(b) by 0 days.

(21) Appl. No.: 15/159,273

(22) Filed: May 19, 2016

(65) Prior Publication Data

US 2016/0341896 A1    Nov. 24, 2016

Related U.S. Application Data

(60) Provisional application No. 62/163,498, filed on May 19, 2015.

(51) Int. Cl.
*G02B 6/122* (2006.01)
*G02B 27/00* (2006.01)
(Continued)

(52) U.S. Cl.
CPC .......... *G02B 6/1228* (2013.01); *G02B 6/126* (2013.01); *G02B 6/305* (2013.01); *G02B 27/0012* (2013.01)

(58) Field of Classification Search
None
See application file for complete search history.

(56) References Cited

U.S. PATENT DOCUMENTS 5,577,141 A * 11/1996 Adar ................ G02B 6/10
   385/43
6,324,326 B1 * 11/2001 Dejneka ............ G02B 6/1228
   359/341.1
(Continued)

OTHER PUBLICATIONS

Spuhler et al., "A Very Short Planar Silica Spot-Size Converter using a Non-Periodic Waveguide", IEEE J. Lightwave Technology, Sep. 1998, vol. 16, No. 9, pp. 1680-1685, Institute of Electrical and Electronic Engineers.

(Continued)

*Primary Examiner* — Chad H Smith
(74) *Attorney, Agent, or Firm* — Norton Rose Fulbright Canada LLP; Alexandre Daoust

(57) ABSTRACT

Photonic integrated circuits required connection to germanium doped silica cored optical fibers or silica cored and fluorine doped silica cladding optical fibers which have low index contrast and large mode field diameters. However, the optical waveguide within a photonic integrated circuit such as formed using silicon-on-insulator or compound semiconductors tends to be high index contrast and small mode field diameter. Accordingly, it is necessary to implement adiabatic waveguide tapers with a high coupling efficiency and small footprint in order to couple into the photonic integrated circuits to/from the optical fiber. Prior art tapers have been generally high loss and absorb valuable die footprint. In contrast the inventors demonstrate a small low loss waveguide taper designed using a methodology they refer to a "constant loss".

7 Claims, 19 Drawing Sheets

(51) Int. Cl.
G02B 6/30 (2006.01)
G02B 6/126 (2006.01)

(56) References Cited

U.S. PATENT DOCUMENTS

| 7,680,371 B2* | 3/2010 | Cheben | G02B 6/1228 385/124 |
| 2002/0159703 A1* | 10/2002 | McGreer | G02B 6/12004 385/43 |
| 2008/0279505 A1* | 11/2008 | Gill | G02B 6/1228 385/50 |

OTHER PUBLICATIONS

Taillaert et al., "Grating Couplers for Coupling between Optical Fibers and NanoPhotonic Waveguides," Japanese Journal of Applied Physics, Aug. 2006, vol. 45, No. 8A), pp. 6071-6077, The Japan Society of Applied Physics.

Pu et al., "Ultra-Low-Loss Inverted Taper Coupler for Silicon-on-Insulator Ridge Waveguide," Optics Communications, 2010. vol. 283, pp. 3678-3682, Elsevier.

Schmid et al., "Refractive Index Engineering with SubWavelength Gratings in Silicon Microphotonic Waveguides", IEEE Photonics Journal, Jun. 2011, vol. 3, No. 3, pp. 598-607, Institute of Electrical and Electronic Engineers.

Cheben et al., "Refractive Index Engineering with SubWavelength Gratings for Efficient Microphotonic Couplers and Planar Waveguide Multiplexers," OSA Optics Letters, Jul. 2010, vol. 35, No. 15, pp. 2526-2528, NRC Publications Archive.

Cheben et al., "Broadband Polarization Independent Nanophotonic Coupler for Silicon Waveguides with Ultra-High Efficiency", OSA Optics Express, Aug. 2015, vol. 23, No. 17, #242283, Optical Society of America Shoji et al., "Low Loss Mode Size Converter from 0.3 um Square Si Wire Waveguides to Singlemode Fibres", IEEE Electronics Letters, Dec. 2002, vol. 38, No. 25, pp. 1669-1670, Institute of Electrical and Electronic Engineers.

Almeida et al., "Nanotaper for Compact Mode Conversion," OSA Optics Letters, Aug. 2003, vol. 28, No. 15, pp. 1302-1304, Optical Society of America.

McNab et al., "Ultra-Low Loss Photonic Integrated Circuit with Membrane-Type Photonic Crystal Waveguides", Optics Express, 11(22), pp. 2927-2939, Optical Society of America.

Rukhlenko et al., "Effective Mode Area and its Optimization in Silicon Nanocrystal Waveguides", OSA Optics Letters, vol. 37, No. 12, pp. 2295-2297, Jun. 2012, Optical Society of America.

Fu et al., "Efficient Adiabatic Silicon-on-Insulator Waveguide Taper", Photonics Research, Jun. 2014, vol. 2, No. 3, pp. A41-A44, Chinese Laser Press.

Xu et al., "Complementary Metal—Oxide—Semiconductor Compatible High Efficiency SubWavelength Grating Couplers for Silicon Integrated Photonics", AIP Applied Physics Letters, Jul. 2012, vol. 101, No. 3, #031109, American Institute of Physics.

Robinson et al., "First-Principle Derivation of Gain in High-Index-Contrast Waveguides" Optics Express, Oct. 2008, vol. 16, No. 21, pp. 16659-16669, Optical Society of America.

Grillot et al., "Size Influence on the Propagation Loss Induced by Sidewall Roughness in Ultra-Small SOI Waveguides", IEEE Photonics Technology Letters, Jul. 2004, vol. 16, No. 7, pp. 1661-1663, Institute of Electrical and Electronic Engineers.

Shen et al., "An Integrated Nanophotonics Polarization Beamsplitter with 2.4×2.4um2 Footprint", Nature Photonics, Jun. 2015, vol. 9, pp. 378-382, Nature Publishing.

* cited by examiner

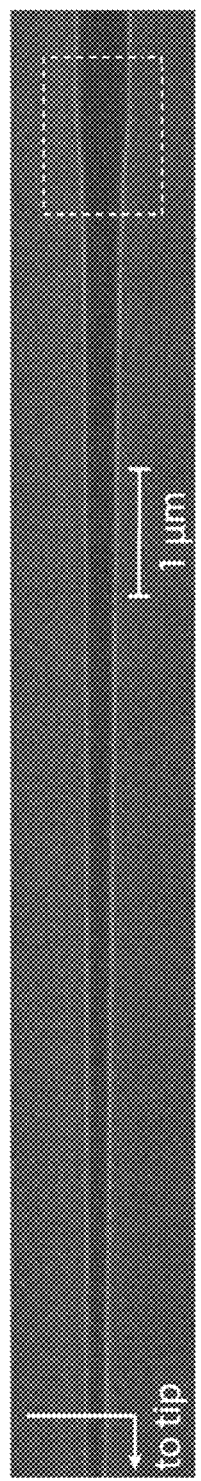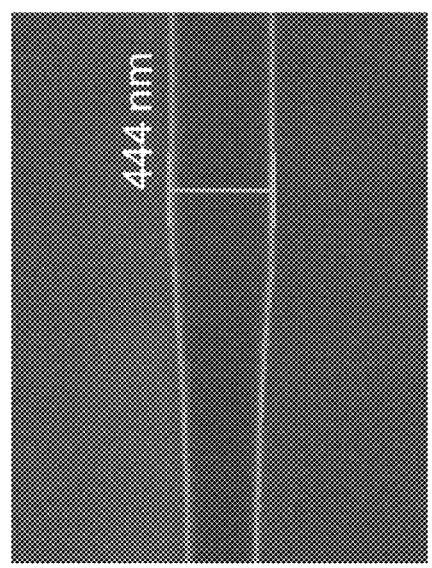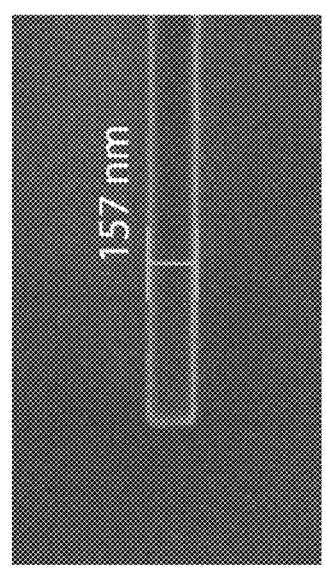
Figure 2B
Figure 2C
Figure 2D $w(x) = linear(x) + a_1 \cdot x(x-L) + a_2 x^2 \cdot (x-L)$

| n | $a_i$ | Loss (%) |
|---|---|---|
| 0 | 0 | 4.20 |
| 1 | 1.04E-10 | 2.08 |
| 2 | -1.94E-12 | 1.87 |

$w(x) = cstloss(x) + a_1 \cdot x(x-L) + a_2 x^2 \cdot (x-L)$

| n | $a_i$ | Loss (%) |
|---|---|---|
| 0 | 0 | 1.63 |
| 1 | 6.70E-14 | 1.63 |
| 2 | -4.80E-15 | 1.63 |

METHODS AND SYSTEMS RELATING TO OPTICAL WAVEGUIDE TAPERS

CROSS-REFERENCE TO RELATED APPLICATIONS

This patent application claims the benefit of priority from U.S. Provisional Patent Application 62/163,498 filed May 19, 2015, currently pending, entitled "Methods and Systems Relating to Optical Waveguide Tapers", the entire contents of which are incorporated herein by reference.

FIELD OF THE INVENTION

This invention relates to optical waveguide tapers and more particularly to a new class of optical waveguide tapers that exhibit constant loss per taper segment with reduced loss to prior art tapers.

BACKGROUND OF THE INVENTION

Silicon photonics exploiting silicon photonic integrated circuits (PICs) relates to the application of photonic systems which use silicon as an optical medium. The silicon is usually patterned with sub-micrometer precision, into photonic components and photonic integrated circuits which operate in the infrared, most commonly at the 1550 nm (1.55 μm) wavelength window used by most fiber optic telecommunication systems as it is the lowest attenuation region for singlemode silica optical fibers. In reality the silicon typically lies on top of a layer of silica in what by analogy with a similar construction in microelectronics for transistors is known as silicon on insulator (SOI).

Silicon photonic devices exploit existing semiconductor fabrication techniques, and because silicon is already used as the substrate for most integrated circuits, it is possible to create hybrid devices in which the optical and electronic components are integrated onto a single microchip. Consequently, silicon photonics is being actively researched by many electronics manufacturers as well as by academic research groups.

Accordingly, within SOI waveguides the high index contrast between silicon ($n_{Si}$=3.47), the underlying silica (silicon dioxide, $SiO_2$, $n_{SILICA}$=1.6), and either air ($n_{AIR}$=1) or silica cladding, does not allow light, at 1550 nm, to extend into the silicon oxide beyond a fraction of a micron. The use of a rib loaded waveguide structure on the top surface of a silicon chip guides the optical power in the plane of the silicon as the effective refractive index in the region with the rib is higher than the adjacent regions without the rib. The resulting SOI waveguide is tightly confined vertically and loosely confined laterally and due to the index contrast Δn~57% SOI waveguides have a small mode field diameter (MFD≈0.3 μm).

In contrast singlemode fiber (SMF) with a germanium doped silica core with silica cladding or silica core with fluorine doped silica cladding have a low index contrast, Δn≈0.036%, such that the typical MFD≈10.4 μm. Accordingly, when a silicon photonic device is to be interfaced to SMF optical fiber then the ratio of mode area ratio between SOI and SMF is approximately 1:1000 (SOI~0.09 μm$^2$: SMF~85 μm$^2$). Accordingly, it is necessary to implement silicon-on-insulator-based adiabatic waveguide tapers with a high coupling efficiency and small footprint in order to couple into the silicon photonic integrated circuits from the SMF optical fiber or vice-versa.

Within the prior art linear and parabolic tapers have been described and implemented to provide such transitions onto and off of the silicon photonic integrated circuit. However, these tend to be high loss and absorb valuable die footprint such that it would be beneficial to provide SOI PIC designers with a taper geometry that offers lower insertion loss and smaller footprint than the prior art but maintains compatibility with standard manufacturing methodologies.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to optical waveguide tapers and more particularly to a new class of optical waveguide tapers that exhibit constant loss per taper segment with reduced loss to prior art tapers.

In accordance with an embodiment of the invention, there is provided a method comprising designing an optical waveguide taper by segmenting the optical waveguide taper into a number of segments such that the incremental loss between each consecutive pair of segments is approximately constant.

In accordance with an embodiment of the invention there is provided a waveguide comprising:
an input waveguide having a first predetermined width;
an output waveguide having a second predetermined width; and
an optical waveguide taper tapering in width from the a first predetermined width to the second predetermined width, the optical waveguide taper comprising a number of segments of waveguide; wherein
the incremental loss between each consecutive pair of segments is approximately constant.

In accordance with an embodiment of the invention there is provided a device comprising a silicon-on-insulator (SOI) optical waveguide comprising an input of a first predetermined width and an output of a second predetermined width wherein the SOI optical waveguide varies according to a predetermined profile between the input and the output.

In accordance with an embodiment of the invention there is provided method of using a design rule for an optical waveguide structure in the design of said optical waveguide structures wherein the design rule relates to an optical waveguide taper such the optical loss versus propagation distance within the optical waveguide taper is approximately constant.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 2B to 2D depict photomicrographs for the fabricated 15 μm-long constant loss taper optimized for TE coupling, the distinctive feature of the constant-loss taper (CLT) that abruptly expands near the final 450 nm width, and the taper tip;

FIGS. 4C to 4F depicts the major component of the electric field at 4 different positions wherein FIGS. 4C and 4F represent the input (155 nm) and output (450 nm) respectively;

DETAILED DESCRIPTION

The present invention is directed to optical waveguide tapers and more particularly to a new class of optical waveguide tapers that exhibit constant loss per taper segment with reduced loss to prior art tapers.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A: Constant Loss Tapers

A1. Introduction

Figure 1A:
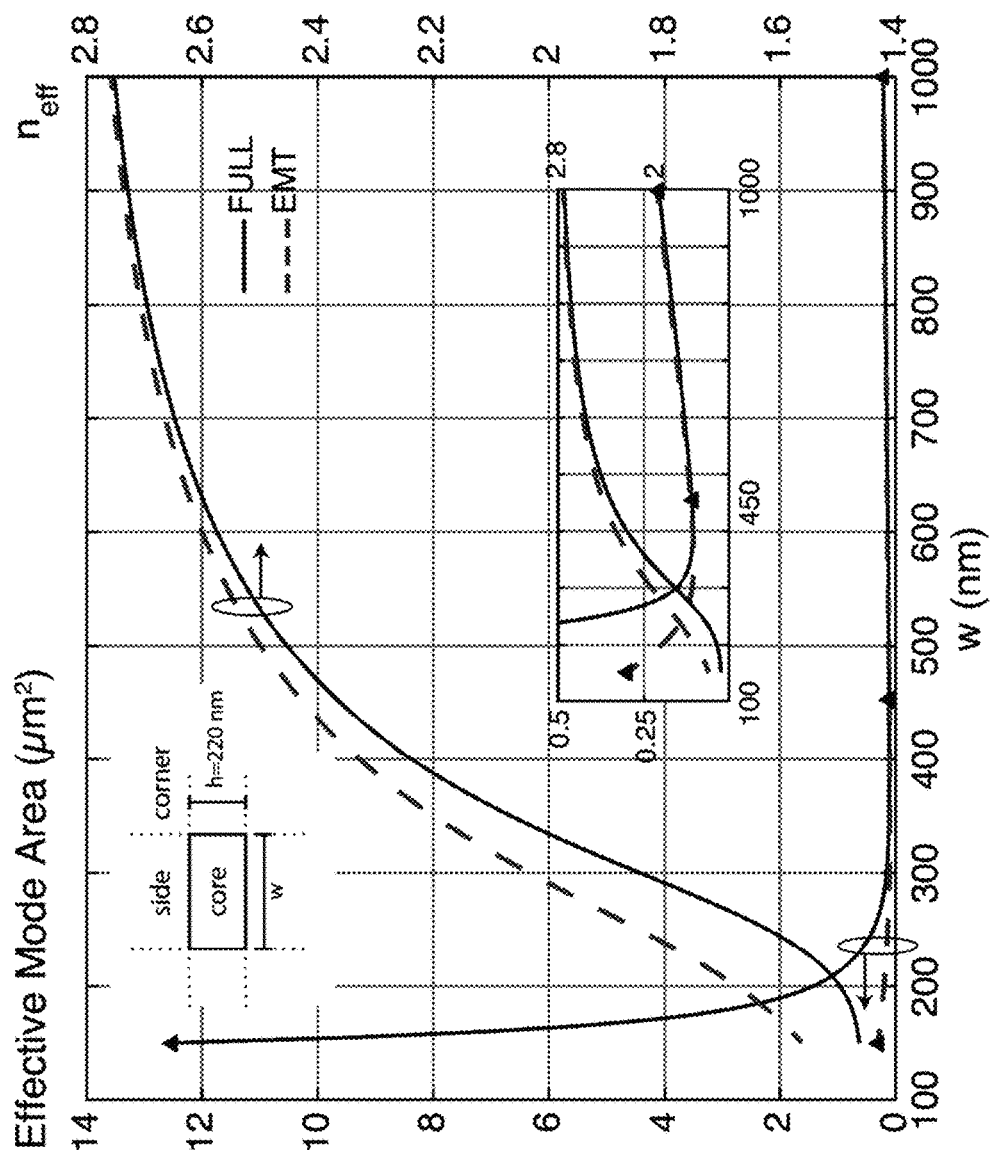
FIG. 1A depicts the effective mode area and effective index ($n_{eff}$) of the fundamental quasi-TE mode at λ=1550 nm for varying waveguide core widths at a core thickness of 220 nm.

The large index of refraction contrast of a silicon-on-insulator (SOI) platform enables high density, cost-effective photonics on a chip. The typical interconnecting channel waveguide on 220 nm SOI has a 450 nm width resulting in a tightly confined mode profile. This type of waveguide is often used to connect integrated devices together since it minimizes the mode area of the waveguide, thereby enabling high-density optical circuitry while keeping the propagation loss small over short distances. However, at the junction between the interconnecting waveguide and the chip external coupling interface there is an intrinsic mode mismatch requiring mode conversion. Tapers are used to gradually convert the mode area and the effective index of the guided mode, typically by varying the waveguide width. In FIG. 1A, the effective mode area (EMA) of a 220 nm thick SOI waveguide is shown as a function of the waveguide width (w) using a full-vectorial mode solver (FULL, solid line) at $\lambda$=1550 nm.

The top-left inset in FIG. 1A depicts the waveguide geometry with the main regions of interest: core, side, and corner. It is observed that the EMA is minimized for the single-mode condition at w=450 nm as evident in FIG. 1A. Here, the EMA is defined by Equation (1) where $S_z=(E \times H) \cdot \hat{z}$ is the Poynting vector, $\hat{z}$ is the unitary vector along the waveguide's propagation axis.

$$EMA = \frac{\left(\int \int S_z dxdy\right)^2}{\left(\int \int S_z^2 dxdy\right)} \quad (1)$$

Figures 1B, 1C, 1D:
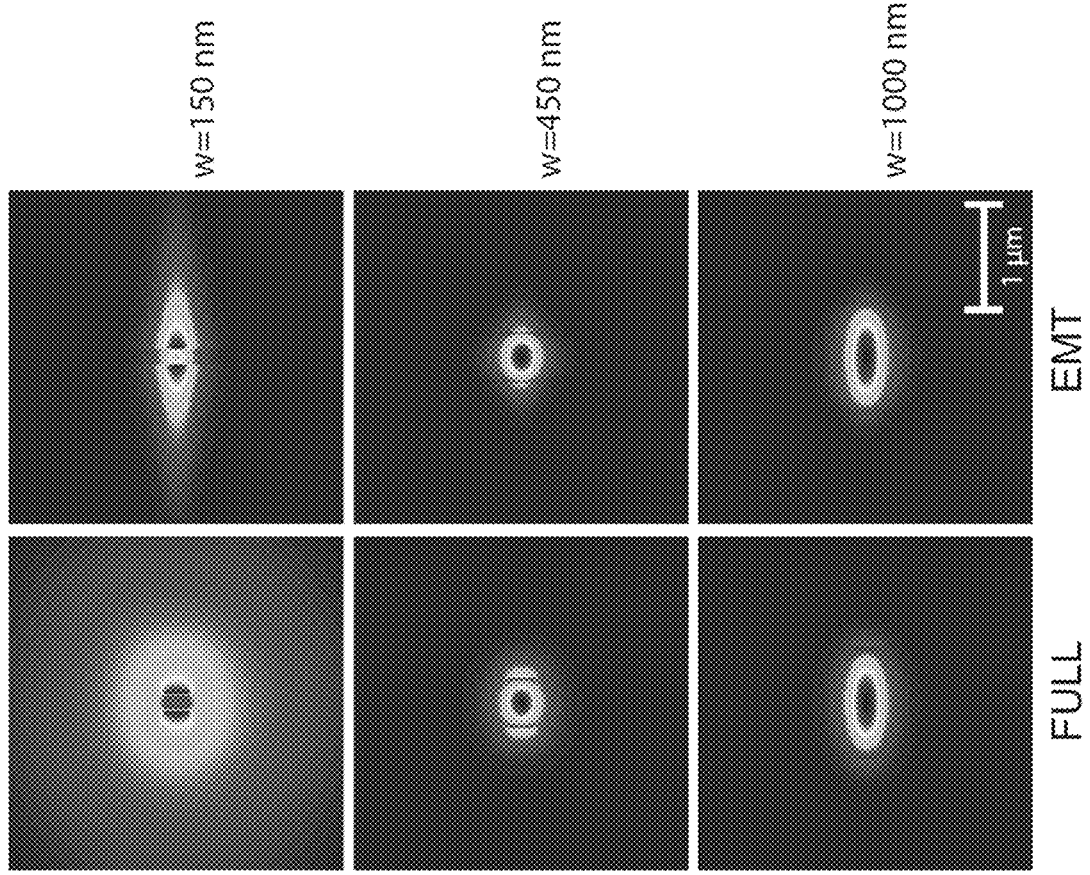
FIGS. 1B to 1D respectively depict the major component of the electric field of the guided mode is shown at w=150 nm, w=450 nm, and w=1000 nm respectively.

Between points (w=450 nm)→(w=1000 nm), the EMA undergoes a direct, linear expansion as shown in the bottom inset of FIG. 1A. During this process, the guided mode remains primarily confined in the silicon core (FIGS. 1C and 1D; FULL) since its effective index remains substantially larger than the cladding index, $n_{CLAD}$=1.46. Because of this core-confined mode profile, the mode area can be well approximated by the dimensions of the core itself, i.e. EMA≅w×h, where h is the waveguide thickness and w is the waveguide width; thus explaining the linear mode expansion relationship. As a result of this linear behaviour, tapers used for a direct expansion almost exclusively use a linear tapering shape, other shapes have been considered showing only marginal improvements. Furthermore, from the evaluated mode profiles (FIGS. 1C and 1D; FULL) it can be seen that the amount of power located in the corner regions of the waveguide is negligible. This allows the use of the effective medium theory (EMT), which separates the field of the guided mode into Cartesian coordinates: $\psi=\psi_x\psi_y$. Using the EMT simplifies the structure to two simple one-dimensional slabs and reduces three-dimensional finite difference time-domain (FDTD) simulations to a less computational intensive two-point-five dimension (2.5D) FDTD. In FIG. 1A, the EMT approximation (broken line) is applied in the direct expansion regime, with the calculated effective indices and mode profiles well approximated by the effective medium theory (FIGS. 1C and 1D; FULL vs EMT), thus confirming the validity of the approximation in this region.

From point (c) of FIG. 1A the mode area can also be increased through an indirect expansion by reducing the width of the waveguide. As w is reduced and reaches sub-wavelength dimensions, <λ/2n, the guided mode can no longer be tightly localized. As a result, the effective index of the waveguide abruptly drops, approaching that of the cladding material, leading to a strong, non-linear expansion of the mode area as seen in the (c)→(b) region. This mode expansion mechanism is often used to design nanophotonic mode converters for fiber-waveguide coupling. However, the EMT can no longer be applied in this sub-wavelength regime since the amount of power in the waveguide corner regions exceeds 80%, as seen at w=150 nm in FIG. 1B; FULL vs EMT. Although the EMT has been used in the inverse expansion regime its use seriously compromises the results. Here, using a full vectorial solver, an inverse taper is designed for maximum coupling efficiency between a 4.9 µm mode-field diameter (MFD) fiber and a silicon waveguide (450 nm×220 nm) for TE polarized light at λ=1550 nm.

A2. Taper Tip Optimization

Figure 2A:
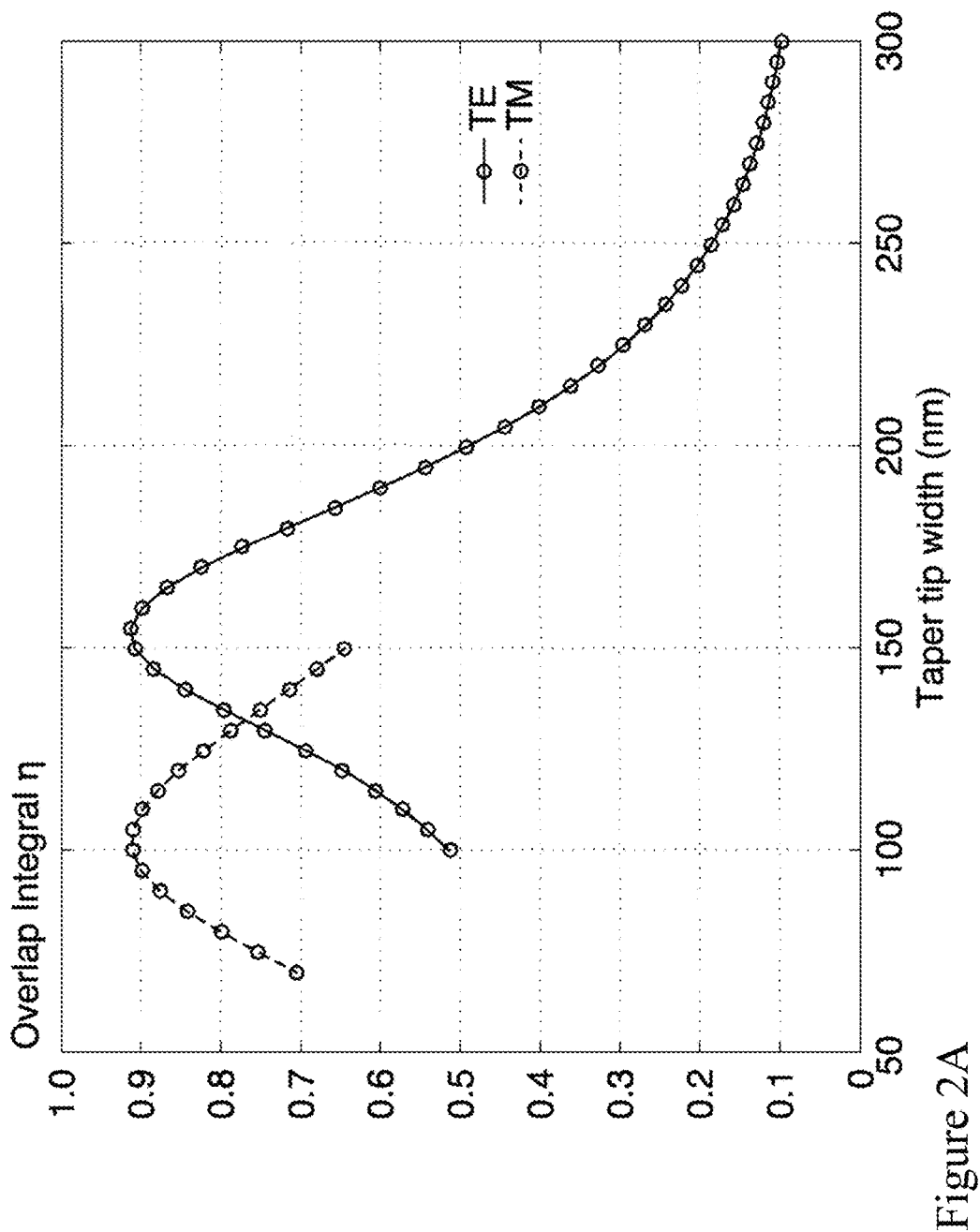
FIG. 2A depicts the overlap integral between the modes of a 4.9 μm MFD fiber and the taper tip of varying widths for quasi-TE and -TM polarizations.

The coupling efficiency between an optical fiber and a SOI waveguide is determined by two main factors: the overlap integral of the electromagnetic fields between the fiber and the SOI waveguide at the tip of the taper, and the efficiency of the mode conversion process between the taper tip and the interconnecting waveguide. FIG. 2A shows the overlap integral between an optical fiber (MFD=4.9 µm; $E_i$, $H_i$) and a silicon waveguide of different widths ($E_j$,$H_j$). The overlap integral, h, is defined by Equation (2). FIG. 2B depicts the taper as implemented together with the waveguide and tip ends in FIGS. 2C and 2D respectively.

$$\eta = \frac{\left|\int\int E_i \times H_j^* dxdy\right|^2}{\left|\int\int E_i \times H_i^* dxdy\right|\left|\int\int E_j \times H_j^* dxdy\right|} \quad (2)$$

The overlap integral is maximized for $w_0$ of 155 nm and 100 nm at η=0.92 (0.36 dB) for the quasi-TE and -TM modes, respectively. The overlap integral sets the upper limit of coupling efficiency since additional loss is expected as the mode propagates through the taper. In the calculation of the overlap integral, the magnetic field should not be simplified as a direct function of its electric counterpart because the SOI waveguide modes are not well approximated by propagating plane waves as they are quasi-TE/TM modes. Accounting for the magnetic components of the guided modes leads to the calculation of optimal tip widths that are 20-30 nm larger than those previously reported.

A3. Constant-Loss Framework

Figure 3A:
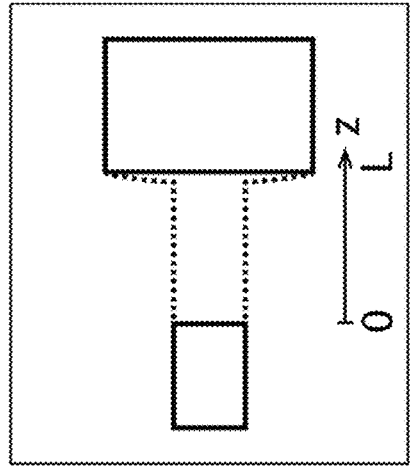
FIGS. 3A to 3C depict pictograms showing various monotonically increasing tapering functions that present the limit cases of potential taper functions.
Figure 3B:
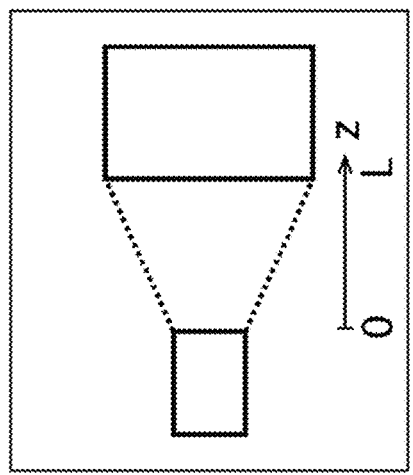
Figure 3C:
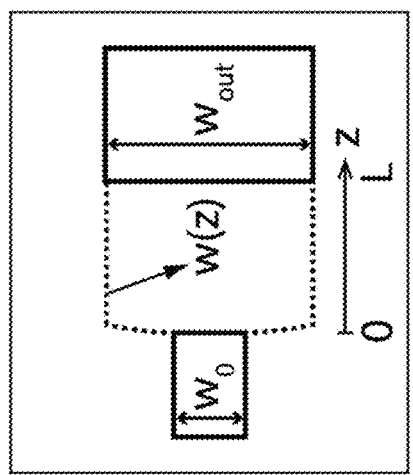

Now that the overlap integral is maximized at the taper's tip, the tapering function needs to be optimized for maximum light coupling efficiency between the tip and the interconnecting waveguide. The range of different, monotonically increasing taper functions to connect the taper tip (width, $w_0$) to the waveguide (width, $w_{out}$) in a given taper length, L, is bounded by the two taper functions shown in FIGS. 3A and 3C. These piecewise functions are equivalent to each other, under the assumption that untapered waveguides are lossless. Given that these functions are abrupt; they represent the least efficient taper functions possible. In-between these cases an optimal taper function, that maximizes the efficiency can be inferred. Among the possible taper functions, the linear taper (FIG. 3B) or the parabolic functions are often used because of their simplicity but not necessarily optimal efficiency. To determine a taper shape with the highest possible efficiency, let us first define the total loss, L{w}, incurred by a taper function, w(z) and the instantaneous taper loss at point z as α(w,ẇ,z). The total loss of the taper can be expressed by Equation (3).

The optimal taper function w(z) that minimizes L{w} can be derived by solving the Euler-Lagrange differential equation given by Equation (4).

Assuming that α does not depend explicitly on z, which is a reasonable hypothesis under the assumption that an untapered waveguide is lossless, e.g. the taper is not within an absorbing waveguide, and that w(z) is a monotonically varying function, then simplified Equation (5) is obtained.

$$L\{w\} = \int_0^L \alpha(w, \dot{w}, z)\, dz \quad (3)$$

$$\frac{\delta\alpha}{\delta w} - \frac{d}{dz}\left(\frac{\delta\alpha}{\delta\dot{w}}\right) = 0 \quad (4)$$

$$\alpha = \dot{w}\frac{\delta\alpha}{\delta\dot{w}} = \text{cst.} \quad (5)$$

Figure 3D:
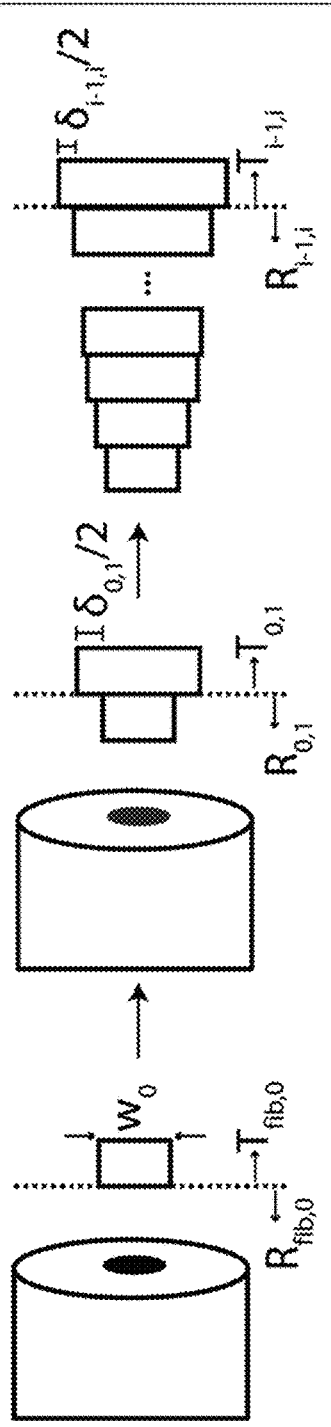
FIG. 3D depicts a method of deriving the constant-loss taper according to an embodiment of the invention.

This implicit equation provides a clear guideline for designing an optimal taper function: the instantaneous loss at any point z within w(z) should be constant. Equation (5) establishes a general design principle that can be applied to engineer different types of photonic devices with varying shape functions. For an inverse taper, α(w,ẇ) depends on the coupling between the guided mode and the radiation modes. Given the infinite number of radiation modes, this calculation is computationally intensive. However, because at any point z along the taper only a single guided mode is supported, the instantaneous transmitted (T) and reflected (R) powers between the guided modes at z− and z+ can be tracked. This approach is complementary to computing the instantaneous power loss to the radiation modes, i.e. α=1−R−T. FIG. 3D schematically shows the inventive taper design approach of the inventors where the taper function is discretized into steps. The width of the first step, $w_0$, is selected to maximize the overlap integral with the optical fiber mode (FIG. 2A); then, recursively, the taper is constructed by adding steps widths, $\delta_{i-1,i} = |w_{i-1} - w_i|$, selected such that the loss penalty is constant, $\alpha_{i-1,i} = \alpha_{threshold}$. To compute the step loss, a coupled-mode theory is employed, leading to Equations (6A) to (6C) respectively. In practice, the reflection coefficient is several orders of magnitude smaller than the transmission coefficient and can often be neglected.

$$T_{i-1,i} = \eta_{i-1,i} \quad (6A)$$

$$R_{i-1,i} = \left|\frac{n_{\it{eff}(i-1)} - n_{\it{eff}(i)}^2}{n_{\it{eff}(i-1)} + n_{\it{eff}(i)}}\right| \quad (6B)$$

$$\alpha_{i-1,i} = (1 - R - T) \cong (1 - T) = \alpha_{threshold} = \text{cst.} \quad (6C)$$

A4. Results

A4.1. Power Tracking

Figure 4A:
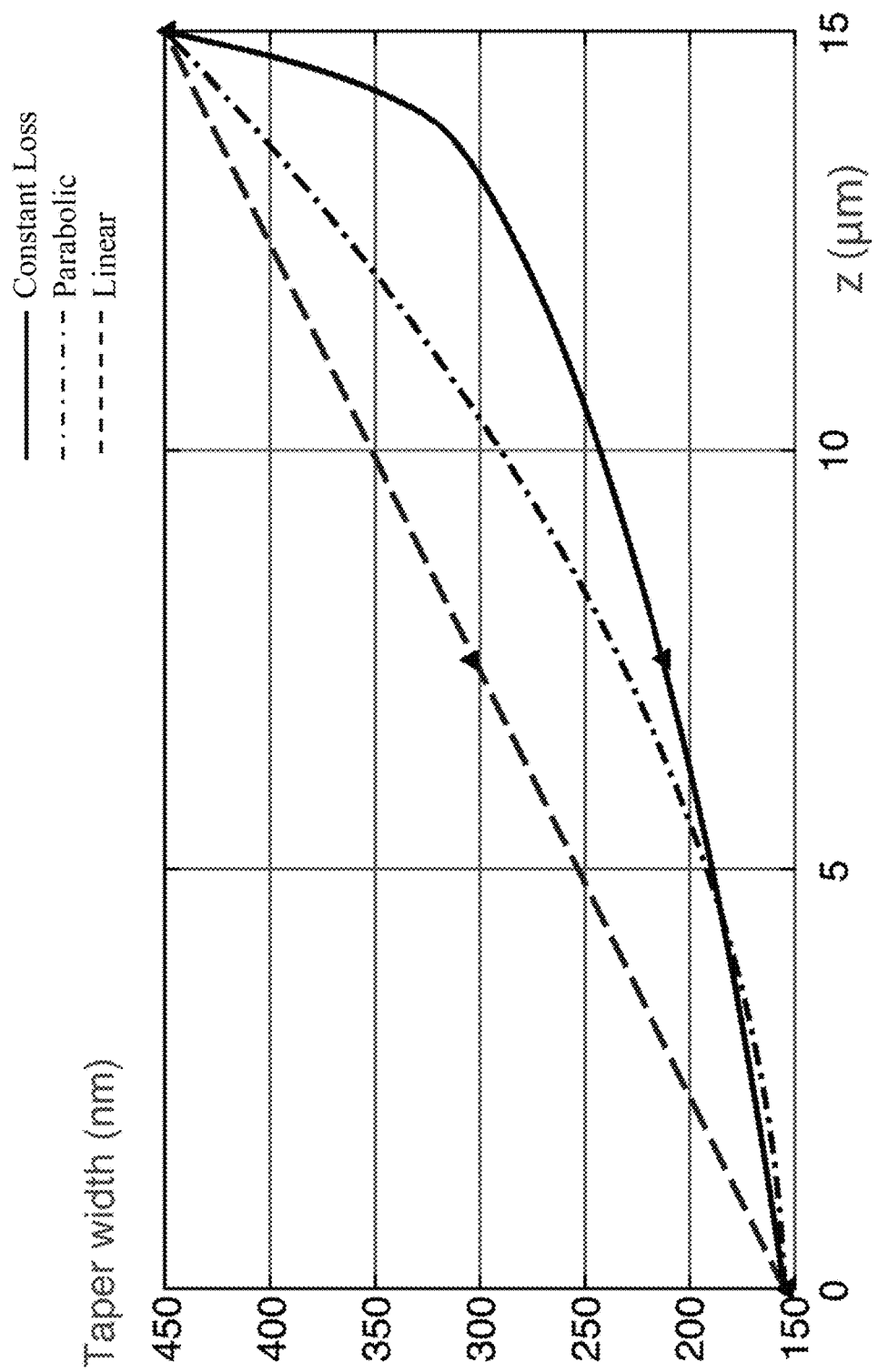
FIG. 4A depicts the width of the linear, parabolic and constant-loss taper as calculated using the constant-loss methodology.
Figure 4B:
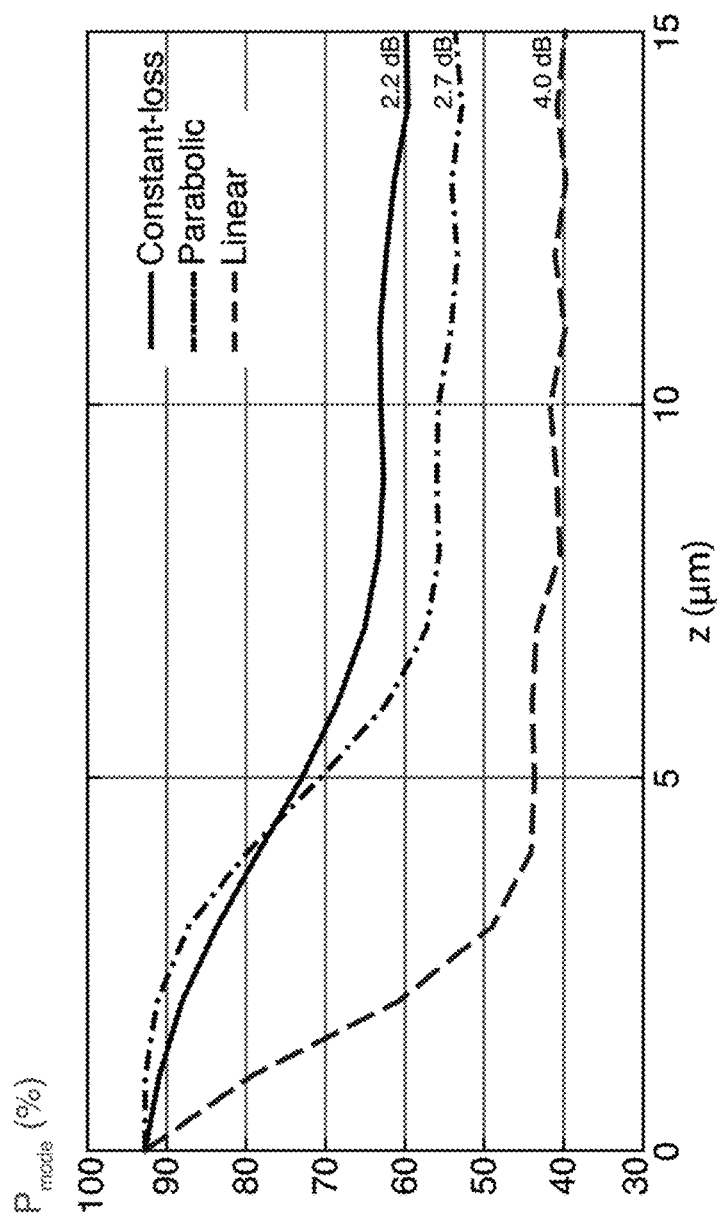
FIG. 4B depicts the power in the guided mode versus propagation distance for the different taper functions.

FIG. 4A compares the width of three different, 15-mm-long taper functions: linear, parabolic, and constant-loss, as calculated using the methodology presented in the previous section. FIG. 4B shows the power in the guided mode using a 3D FDTD simulation.

Figures 4C, 4D, 4E, 4F:
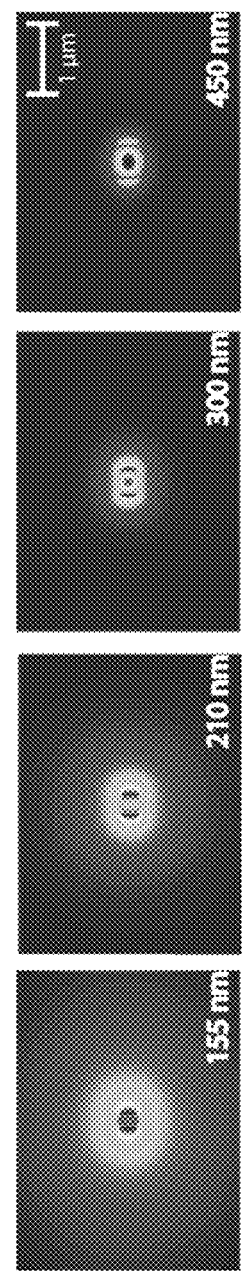

In FIG. 4B, at a given position z, the total power ($P_z$) is compared to the Gaussian, 4.9 μm MFD source power, $\Gamma_{z,source}=P_z/P_{source}$. Subsequently, the overlap integral between the field distribution and the local guided mode at z is calculated to obtain the power in the guided mode, $P_{mode}=\Gamma_{z,source}\cdot\eta_{z,mode}$. In FIG. 4B, all three tapers start with 92% of the source power guided in the tip mode (FIG. 2). In the linear taper, light is substantially dissipated near the tip as the mode propagates along the first 4 μm of the taper. The parabolic taper, whose width increases more slowly initially, yields an improved taper function. The best taper function is the constant-loss taper in which the mode conversion loss is more evenly distributed along the taper, in spite of the fast tapering rate in the 13-15 μm range (FIG. 4A). The not quite linear power decay characteristic of the Constant Loss Taper (CLT) in FIG. 4B is likely because a simple coupled-mode theory formalism was used to implement the constant-loss formalism; use of a finer 3D FDTD mesh could also improve the linearity of the loss profile. Halfway through the taper, the electric fields along the constant-loss taper and linear taper are compared in FIGS. 4D and 4E, respectively. In this region, the constant-loss taper is in an intermediate state of field delocalization while the mode conversion process of a linear taper is mostly completed, indicating that the constant-loss taper shape more efficiently uses the conversion length L available. The electric fields at the tip (w=155 nm) and waveguide (w=450 nm) are depicted in FIGS. 4C and 4F respectively.

A4.2. Taper Length Dependency

Figure 5:
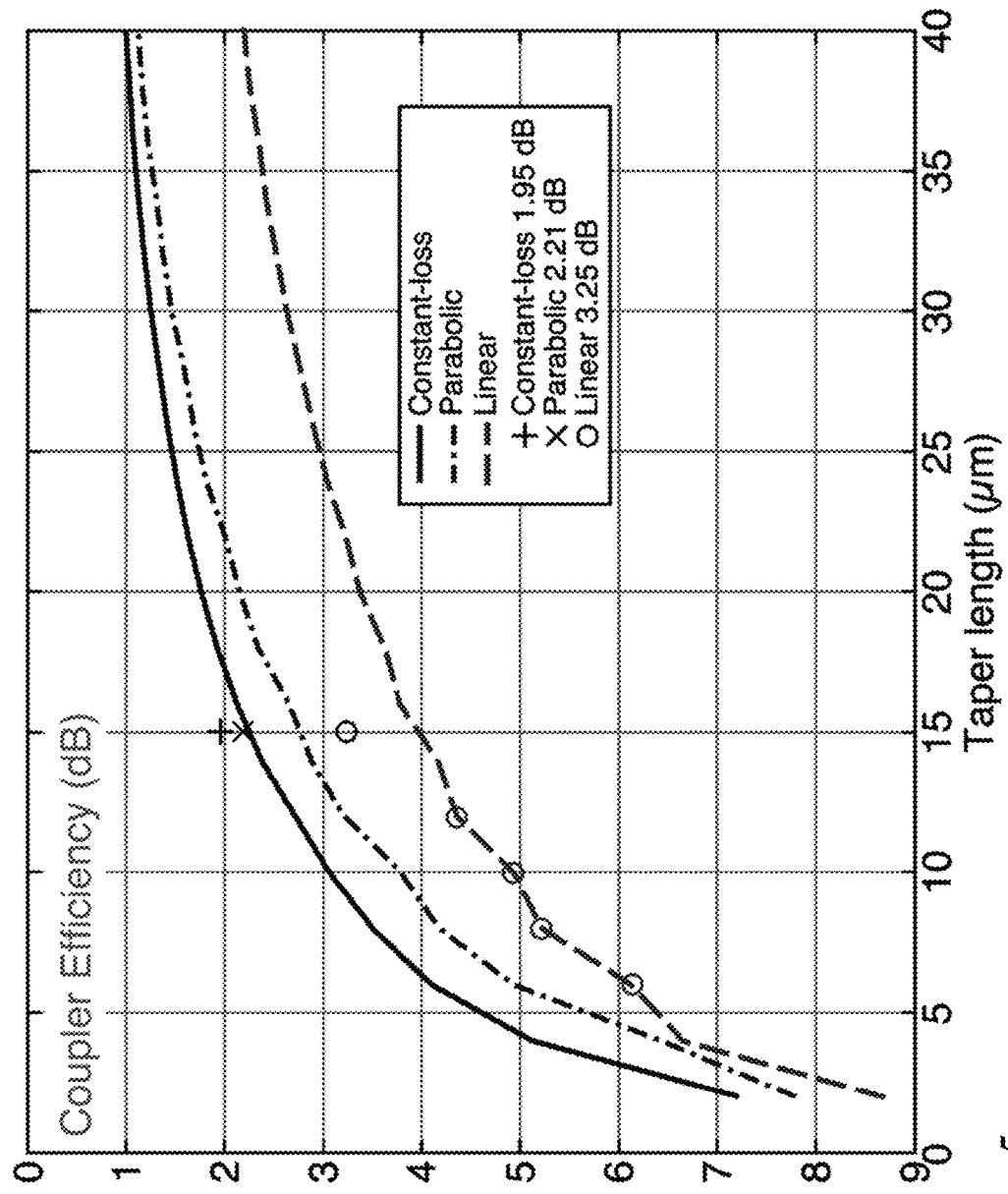
FIG. 5 depicts coupler efficiency as a function of the taper length with a 4.9 μm MFD fiber using a 3D FDTD simulation and measured efficiency for 15 μm long tapers.

FIG. 5 shows the coupler efficiency as a function of taper length simulated in 3D FDTD. One can observe that the efficiency of the couplers increases with increasing taper lengths; furthermore, the CLT is found to be more efficient than either the parabolic or linear taper shape, for any taper length. It is worth nothing that the simulations that were used to compute the curves in FIG. 5 did not include a finite buried oxide layer (BOX) and therefore radiation losses to the substrate are neglected; i.e. FIG. 5 shows how the coupler efficiency is impacted by the mode transformation loss only. In actuality, radiation losses to the substrate would limit the maximal achievable efficiency; as the tapers are made longer, the gain in efficiency that a smoother mode transformation process brings diminishes, as seen in FIG. 5 at longer taper length, while the radiative losses would steadily increase with length. For example, a 15-mm-long constant-loss taper has approximately the same efficiency mode transformation loss than a 22-mm; but the parabolic taper, being longer, would suffer from greater radiation losses. An important goal in designing practical edge coupling structures is to expand the mode size to match fibers with large mode field diameters in order to relax the fiber alignment tolerances. For typical BOX layer thicknesses used (2-3 μm) loss by light leaking into the substrate becomes a limiting factor to the overall coupling efficiency. These substrate losses can be minimized for a given mode size by minimizing the taper length, the constant-loss taper quantifies the miniaturization that can be achieved by optimal design of the widely used inverse taper couplers.

A4.3. Taper Robustness to Fabrication

In FIG. 5, the linear (and to a lesser extent the parabolic) taper exhibits a pronounced point-to-point jaggedness (four points are specifically shown). This is attributed to the 3D FDTD grid approximating the taper. Because the CLT's shape is close to minimizing the coupler's loss at each point, shape distortions incurred by the mesh affect less its efficiency compared to the linear shape. The mesh distortions effect is roughly analogous to the distortions that can be introduce in fabrication; therefore, the CLT is expected to be more robust to fabrication.

Figure 6:
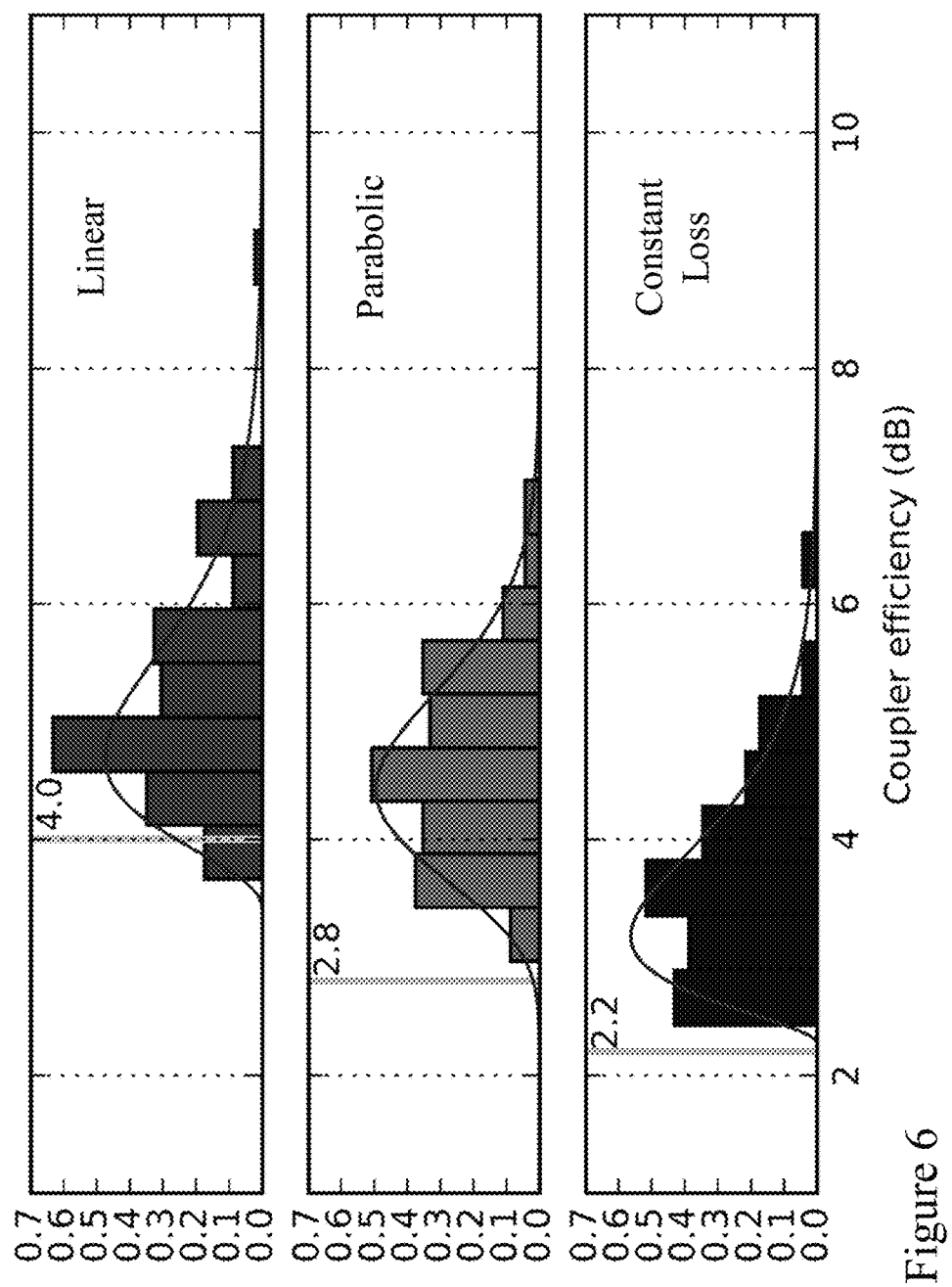
FIG. 6 depicts the distribution of the coupler loss efficiency given roughness perturbations for a linear, parabolic, and constant-loss tapers respectively where the vertical annotated line show the reference coupler efficiency of an unperturbed taper.

In order to further demonstrate the robustness of the constant-loss taper to fabrication, 15 μm-long tapers were perturbed using an exponential autocorrelation roughness model with a standard deviation of 25 nm and a autocorrelation length of 250 nm. A total of 100 perturbation profiles were generated for each coupler and then simulated in 3D FDTD. FIG. 6 reports the normalized probability distribution of the coupler efficiency given our perturbation model. It can clearly be seen that not only is the constant-loss taper more efficient, but its distribution is more tightly grouped near the unperturbed taper's efficiency showing that the constant-loss taper is indeed more robust to fabrication than the linear or parabolic liner taper. The linear taper actually has some perturbed tapers (5 counts) that outperformed the unperturbed case; the efficiency of the linear taper is very sensitive to perturbation that occurs near its tip, as seen in FIG. 4B, as some result perturbations that resulted in making the tip of the linear taper less abrupt resulted in a slightly better coupler. The median coupler efficiencies are 5.0, 4.6, and 3.5 dB respectively for a linear, parabolic, and constant-loss taper. In an industrial setting, producing components that have increased robustness to fabrication is key in improving one's fabrication yield, use of a constant-loss taper would result in improved taper fabrication robustness.

A4.4. Experimental Results

Inverted tapers were fabricated using a 220 nm silicon-on-insulator wafer with 3 mm buried oxide layer. The structures were defined using a hydrogen silsesquioxane (HSQ) resist with a inductively coupled, SF6-C4F8 plasma etching and covered in a 3 mm thick plasma enhanced chemical vapor deposition (PECVD) oxide. In FIG. 5, at an approximately 15 μm taper length, the expected efficiency of a constant-loss taper is noticeably higher compared to a linear or parabolic taper, therefore 15 μm long tapers were fabricated. Using a tunable laser and a polarization controller, light was coupled to a polarization-maintaining, 5 μm MFD or 3 μm MFD, lens fiber. The insertion loss of a single coupler was determined by measuring the total insertion loss to the chip, the total loss is composed of the loss from the input coupler, the waveguide, and the output coupler. The loss from the waveguide was de-embedded from the total insertion by measuring the waveguide loss through the cut-back method. Specifically, the waveguide loss was measured at 1.1 dB/cm or 0.53 dB for our 480 μm long waveguide. This low waveguide loss enables precise measurement of the coupler's loss given that only 0.53 dB had to be deducted from the total insertion loss measurement in order to receive the couplers' loss.

The measured efficiencies are reported in FIG. 5 for the 5 μm MFD fiber. The CLT is the best taper at 1.95 dB followed the parabolic (2.21 dB), and linear (3.25 dB). Measured efficiencies are slightly higher than simulated and this is attributed to the lens fiber used that collimates the beam to a 5 μm spot. Using a 3 μm MFD fiber, the measured efficiencies improved respectively to 0.56 dB, 0.84 dB, and 0.95 dB. Use of the smaller MFD fiber resulted in better efficiency since radiation losses to the substrate were not as dominant as they are with a larger MFD fiber. Specifically, the efficiency of the constant-loss taper measured at 0.56 dB is remarkably high given its short 15 μm length.

B. Segmented Constant Loss Tapers

Figure 7:
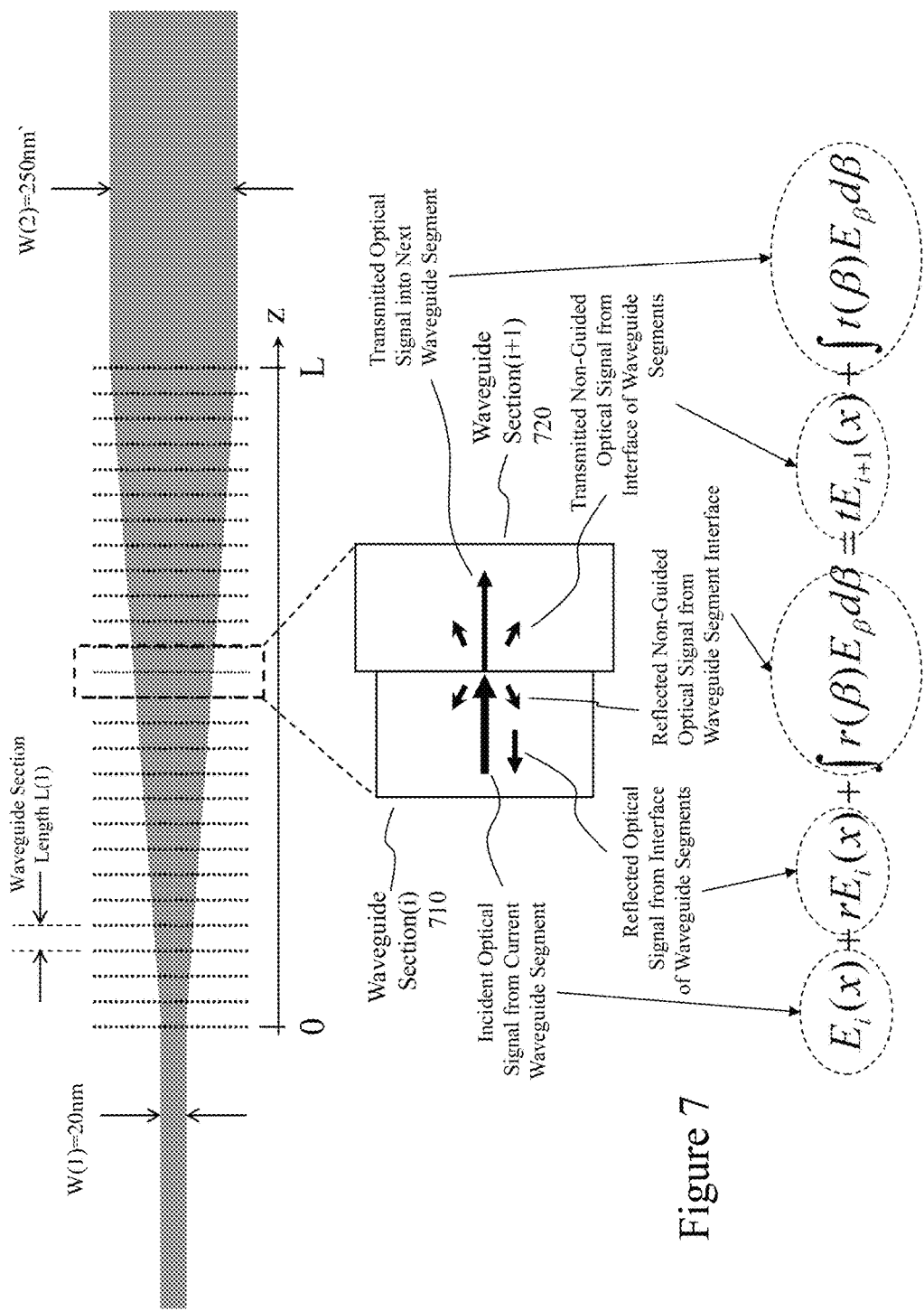
FIGS. 7 and 8 depict the basis of coupled mode theory as applied in modelling a linear taper.
Figure 8:
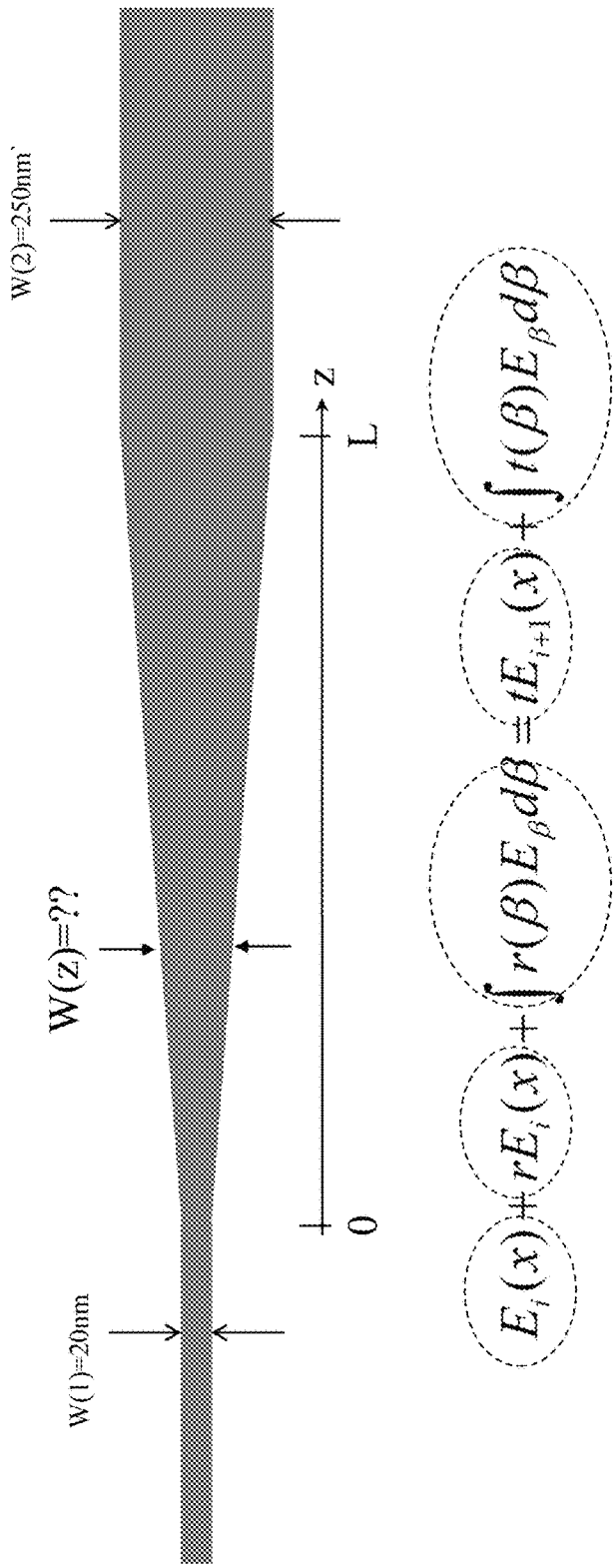

Referring to FIGS. 7 and 8 there are depicted the basis of exploiting coupled mode theory as applied to the modelling of a linear taper. However, it would be evident that coupled mode theory represents one formalism to calculate the losses throughout the tapers according to embodiments of the invention and design/model such tapers. Others may be employed as would be evident to one skilled in the art including, for example, finite-difference time domain (FDTD) and beam propagation method (BPM). Further, in some instances combinations of models may be employed.

As depicted the waveguide taper starts from an initial width W(1)=20 nm and over its length L increases in taper width to W(2)=250 nm. The resulting linear taper is then broken into a number of sections each of an intermediate width. At the transition from one waveguide section 710 to another waveguide section 720 then there are the following optical signals to consider:

1) The optical signal propagating within the current section;
2) The optical signals coupled forward and guided by the next section;
3) The optical signals coupled forward but not guided by the next section;
4) The optical signal reflected at the segment boundary and guided by the current section; and
5) The optical signal reflected at the segment boundary but not guided by the current section.

Accordingly, each of these is associated with a term in the equation depicted in FIG. 7 defining the boundary between the $i^{th}$ and $(i+1)^{th}$ segments wherein the terms r and $r(\beta)$ relate to the reflected portions and t and $t(\beta)$ relate to the transmitted portions. Now using mode orthogonality then as depicted within FIG. 8 the terms r and t can be defined in terms of propagation constants $\beta$ and modal electric fields E(x) and the loss at each interface determined.

Figure 9:
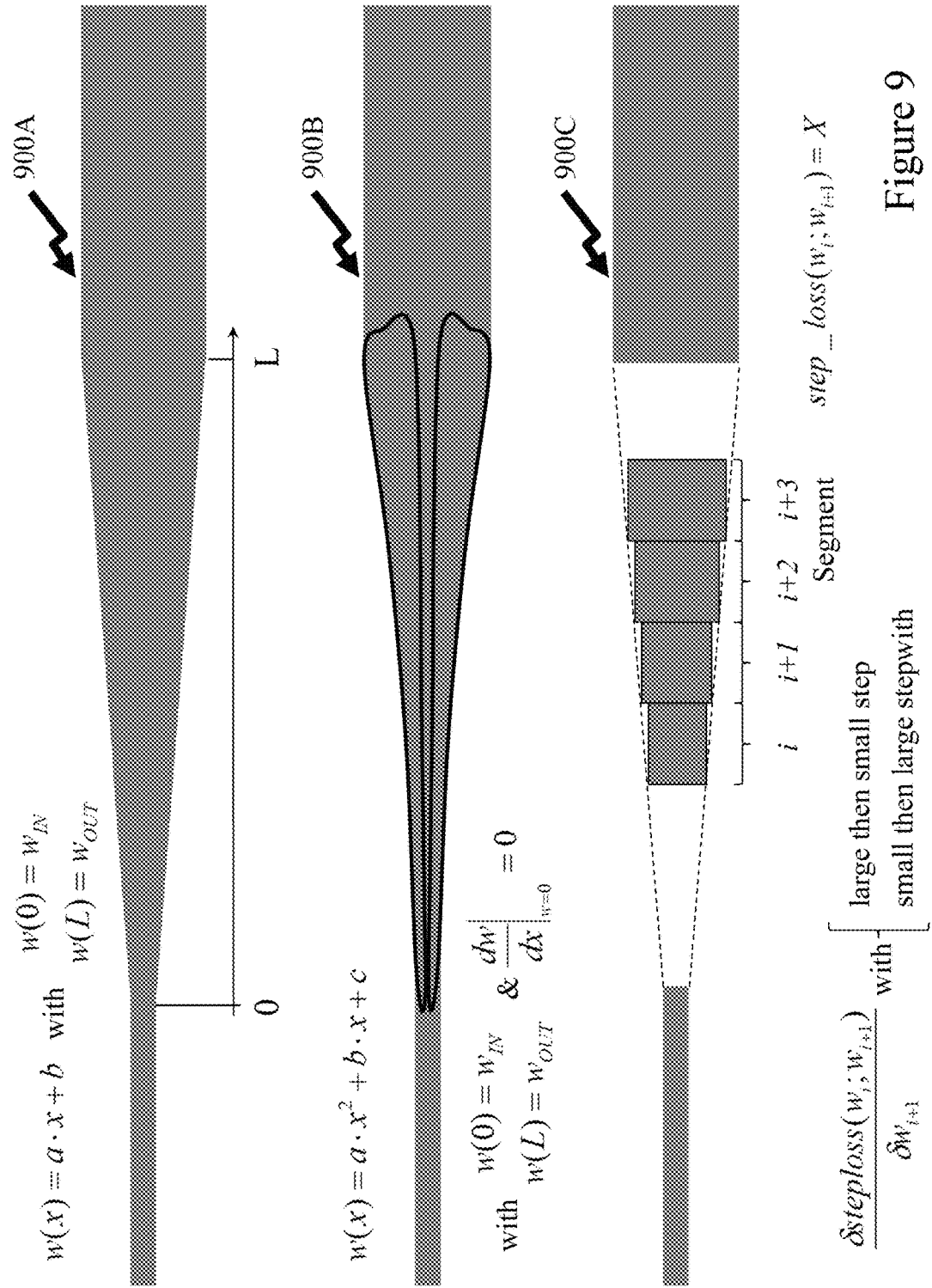
FIG. 9 depicts prior art linear and parabolic tapers together with a segmented constant loss taper according to an embodiment of the invention.

Referring to FIG. 9 there are depicted prior art linear taper 900A and parabolic taper 900B together with a segmented constant loss taper 900C according to an embodiment of the invention. Mathematically the prior art linear taper 900A is defined such that the waveguide width w(x) is defined by w(x)=a·x+b such that for x=0 w(0)=$w_{IN}$ and that for x=L w(L)=$w_{OUT}$. In contrast the prior art parabolic taper 900B is defined such that the waveguide width w(x) is defined by w(x)=a·$x^2$+b·x+c such that again the same start and end boundary conditions of w(0)=$w_{IN}$ and w(L)=$w_{OUT}$ are met but now we also have dw/dx$|_{w=0}$=0. In contrast the Segmented Constant Loss Taper (SEG-CLT) taper 900C is defined such that step_loss($w_i$;$w_{i+1}$)=X, a constant and accordingly based upon the rate of loss with width $\delta$steploss ($w_i$;$w_{i+1}$)/$\delta w_{i+1}$ such that if this is large then the taper is implemented with a large number of small step transitions but if this is small then the taper is implemented with a small number of larger step transitions.

Figure 10:
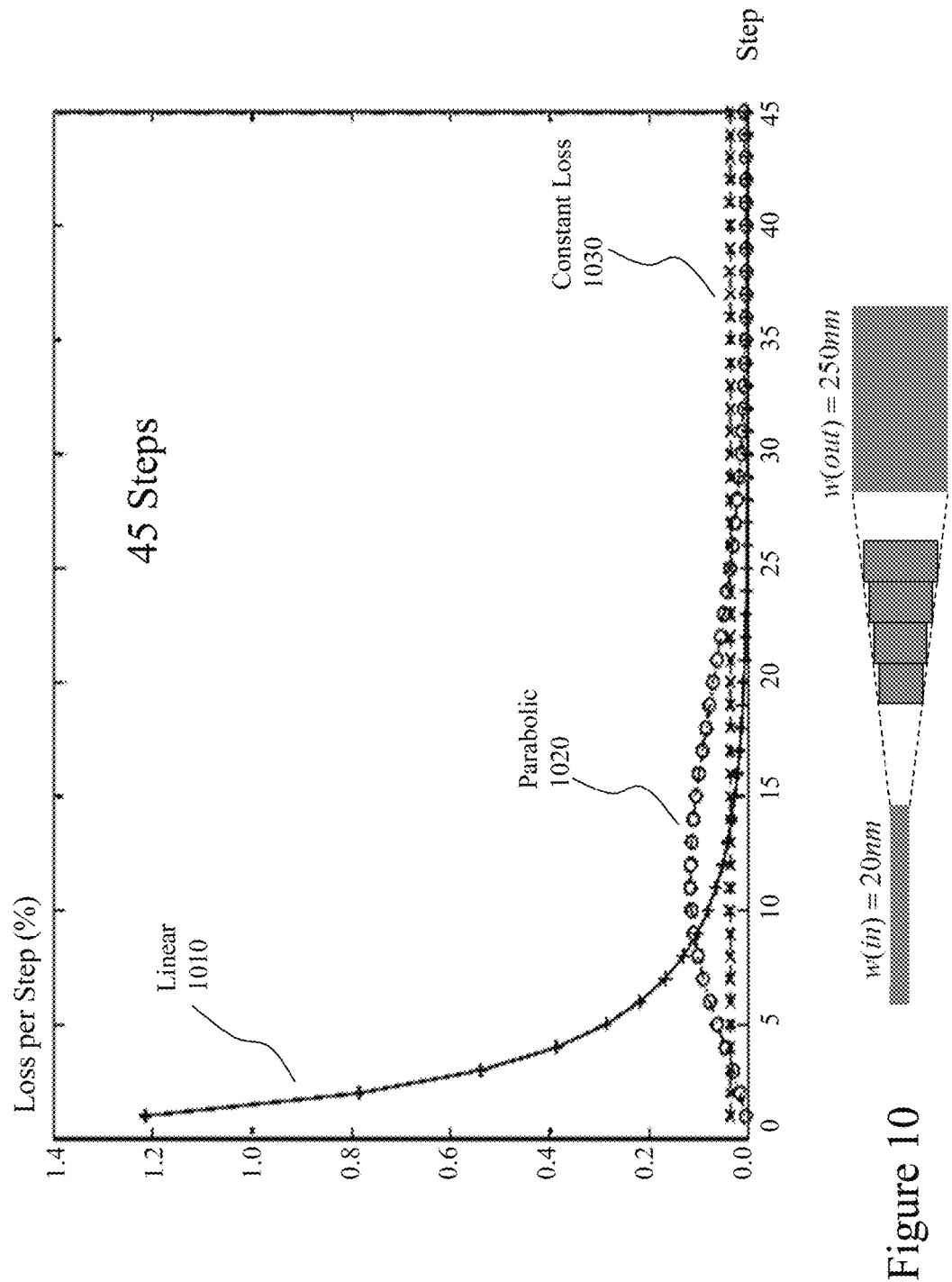
FIG. 10 depicts results of modelling prior art linear and parabolic tapers together with a segmented constant loss taper according to an embodiment of the invention.
Figure 11:
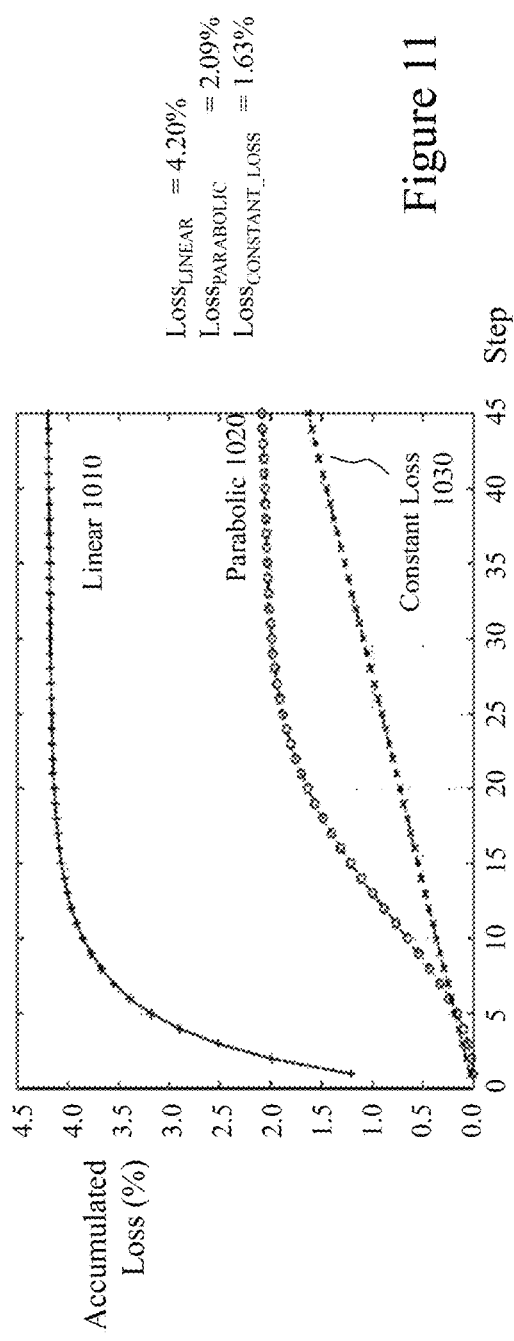
FIGS. 11 and 12 depict cumulative loss and taper geometry versus position for prior art linear and parabolic tapers together with a segmented constant loss taper according to an embodiment of the invention.
Figure 12:
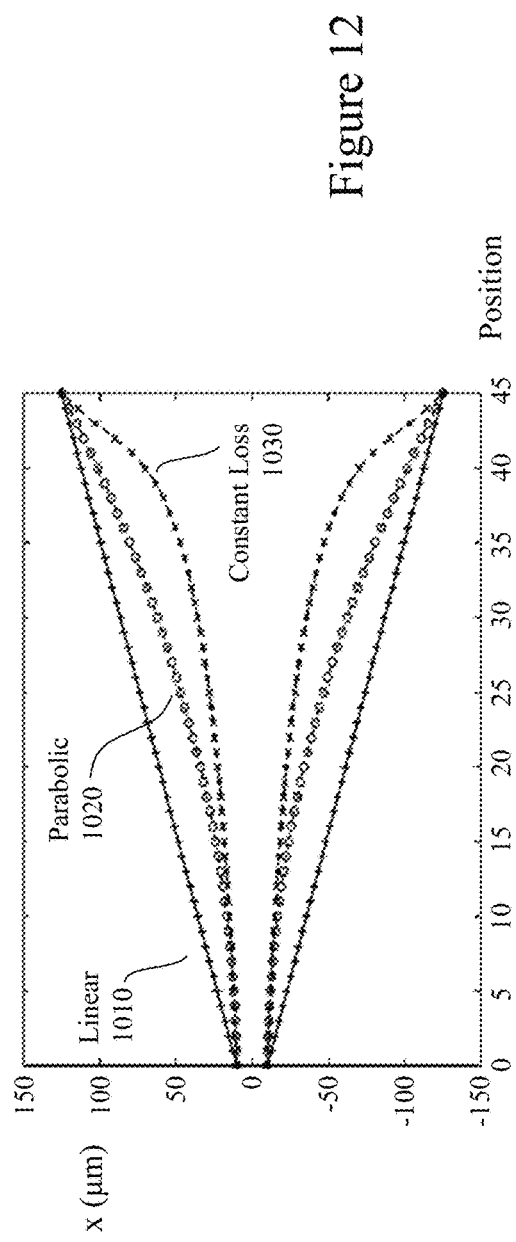
Figure 13:
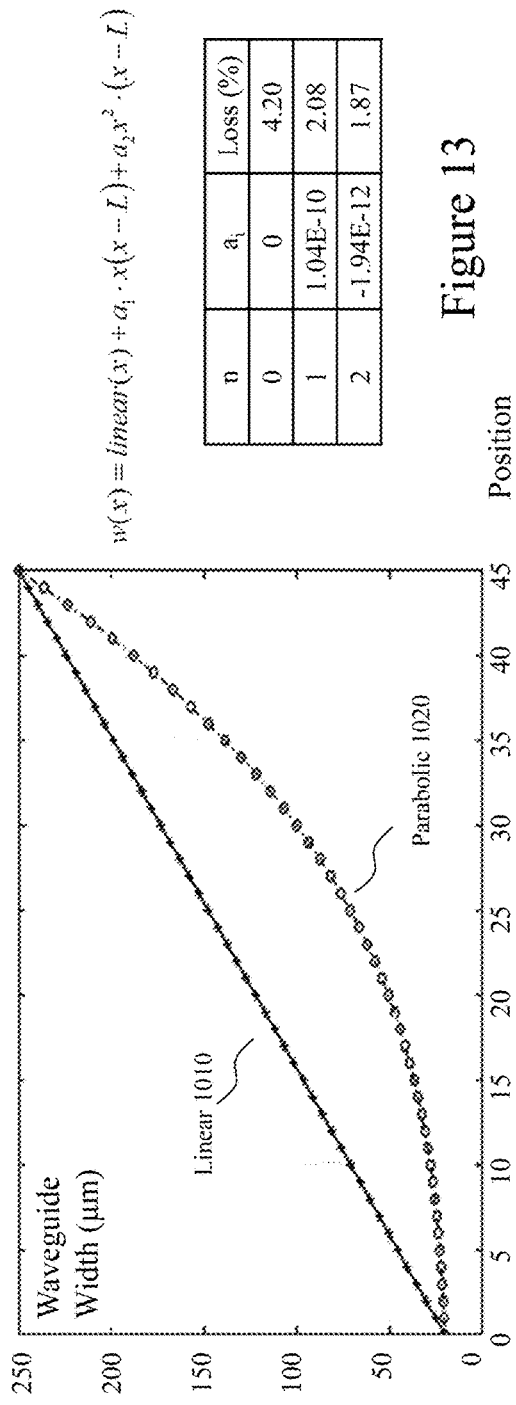
FIGS. 13 and 14 depict taper width versus position for prior art linear and parabolic tapers together with a segmented constant loss taper according to an embodiment of the invention.
Figure 14:
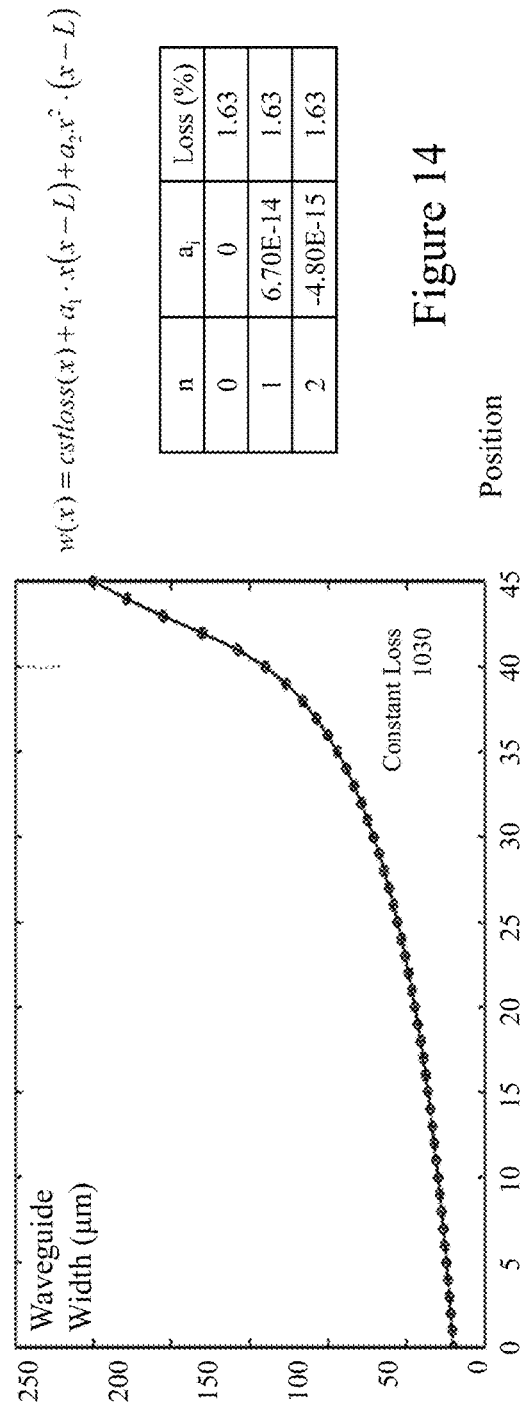

Now referring to FIG. 10 there are depicted 2D simulation results of modelling prior art linear taper 1010 and parabolic taper 1020 together with a SEG-CLT taper 1030 according to an embodiment of the invention wherein the number of steps within the tapers were set to 45 in each case. Accordingly, it can be seen that the SEG-CLT taper loss versus taper section is constant as expected whilst that from the linear taper follows an approximately inverse exponential curve where in the initial segment transitions are very lossy but the later transitions are low loss. In contrast to these the parabolic taper starts and ends with low losses for segment transitions but in the first half rises in loss per segment before reducing. Accordingly, the accumulated loss after each segment is displayed in FIG. 11 wherein the accumulated loss of the linear taper 1010, parabolic taper 1020 and SEG-CLT taper 1030 are 4.2% (0.19 dB), 2.1% (0.09 dB) and 0.16% (0.07 dB) respectively. The resulting profiles of the three different waveguide tapers are depicted in FIG. 12 wherein it can be seen that whilst the loss per segment transition is constant, FIG. 11, the width rate of change varies substantially with the largest rate at the larger widths towards the end of the taper. These are depicted as the evolution of half-width of the waveguide for linear taper 1010 and parabolic taper 1020 in FIG. 13 and the SEG-CLT taper 1030 in FIG. 14.

Figure 15:
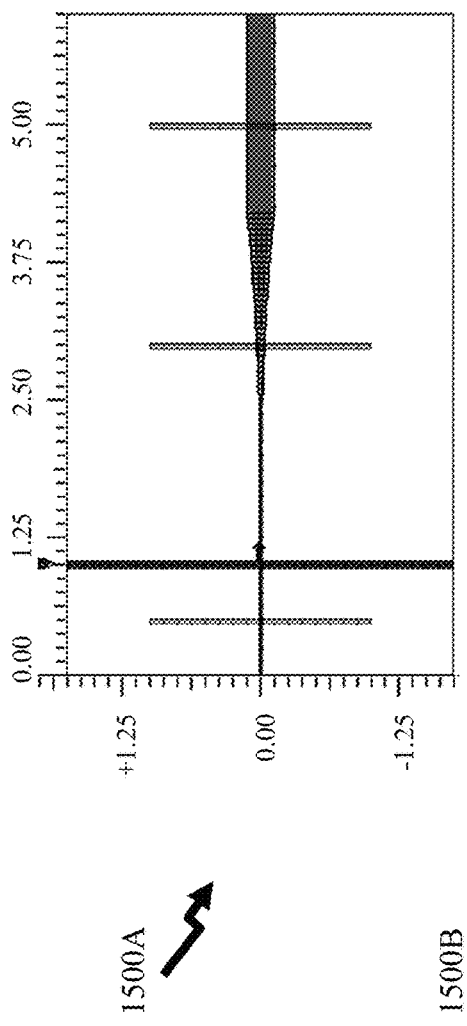
FIG. 15 depicts the results of finite difference time domain (FDTD) modeling for prior art linear and parabolic tapers together with a segmented constant loss taper according to an embodiment of the invention.
Figure 15:
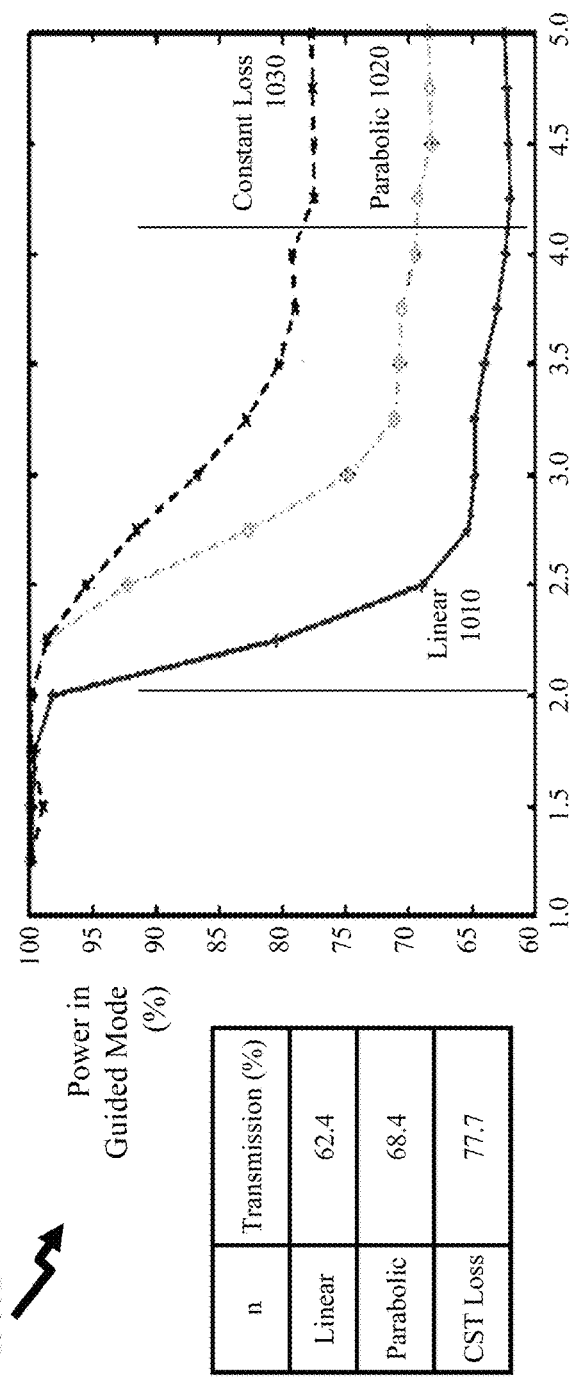

The inventors have also modelled the different tapers using finite difference time domain (FDTD) modeling for prior art linear and parabolic tapers together with a SEG-CLT according to an embodiment of the invention. The resulting modelled geometry for a SEG-CLT taper is depicted in FIG. 15 in first graph 1500A whilst second graph 1500B depicts the FDTD modelling results for the three tapers wherein the resulting losses for the linear taper 1010, parabolic taper 1020 and SEG-CLT taper 1030 were 37.6% (2.05 dB), 31.6% (1.65 dB) and 22.3% (1.1 dB) respectively.

C: Extensions of Constant Loss Tapers and Segmented Constant Loss Tapers

It would be evident to one skilled in the art that whilst the embodiments of the invention have been presented based upon SOI waveguides that alternate embodiments may be implemented with the same waveguide material system and other material systems. For example, other material systems including, but not limited to, $SiO_2$, $Si_3N_4$, $SiO_xN_y$, Si, $LiNbO_3$, InP, InGaAsP, GaAs, AlGaAs, GaInN, AlInGaP, GaInNAs, and polymers may be employed.

It would be evident to one skilled in the art that whilst the embodiments of the invention have been presented based upon optical waveguides within the near infrared ($\lambda$=1550 nm) that alternate embodiments may be implemented at other optical wavelengths according to the waveguide material(s) from ultra-violet to far infra-red. Further embodiments of the invention may be implemented for microwave waveguides and other electromagnetic waveguides.

It would be evident to one skilled in the art that the optical waveguides exploiting embodiments of the invention may be formed through a range of techniques including, but not limited to, material composition, rib-loading, ridges, doping, ion-implantation, and ion-exchange.

It would be evident to one skilled in the art that optical waveguides exploiting X-on-insulator may include, but not be limited to, silicon, germanium, silicon nitride—silicon, intrinsic BOX layers, fabricated BOX layers, and silicon-oxide clad silicon.

Figure 16:
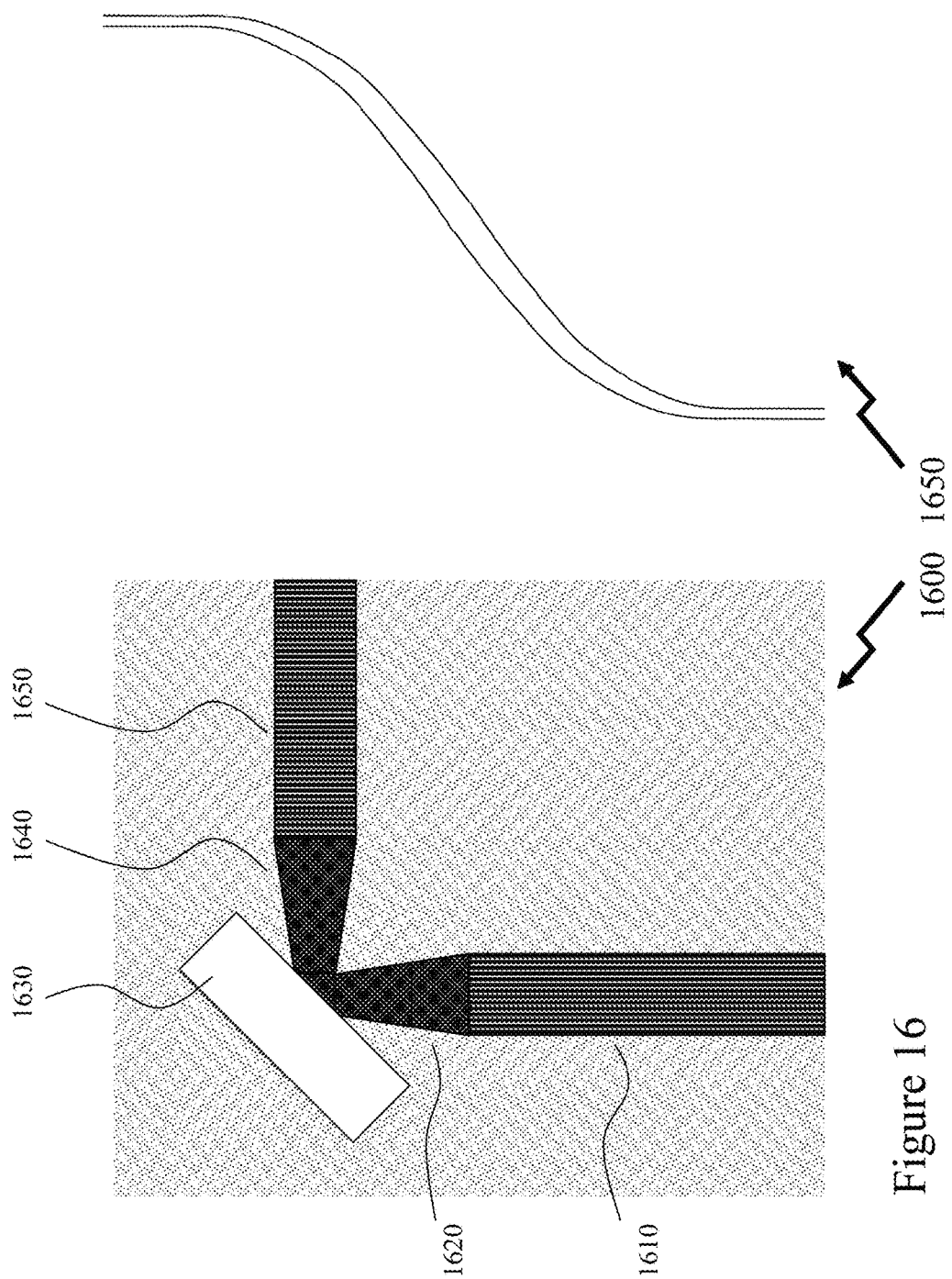
FIG. 16 depicts exploitation of constant loss tapers according to embodiments of the invention within waveguide bends and turning mirrors.

Further, the embodiments of the invention may be exploited to provide short low loss waveguide tapers in order to provide enhanced small footprint bends and 90° bends. Accordingly, a SEG-CLT or CLT may be employed as depicted in FIG. 16 wherein in first schematic 1600 an input waveguide 1610 is coupled to an output waveguide 1650 via an etched reflector 1630 wherein input and output tapers 1620 and 1640 respectively, which may be SEG-CLT and/or CLT, provide mode expansion/reduction to/from the reflector 1630 thereby reducing the impact of surface roughness and increasing tolerances on the formation of the reflector 1630. Optionally, the reflector 1630 may be metallized on its vertical surface adjacent the waveguides to increase reflectivity. Further, whilst it is known to employ waveguide bends that are dual-circular arc segments these present increased losses due to the discontinuous radius at each straight waveguide interface and at their junction in the middle. Whilst it is also known to employ waveguide bends which exploit a mathematical function which either continuous in first differential of radius with position or continuous in first and second differentials in radius with position the inclusion of waveguide tapers such as SEG-CLT and CLT has not been considered such that the waveguide width can be also varied with position to provide increased/reduced confinement as desired around the waveguide bend. For example, in the transition around the bend increased confinement may be desired whilst at the straight waveguide interfaces reduced confinement so that low losses result, in fact the straight waveguide may taper as well. If two waveguides are intended to cross, then reduced confinement may be beneficial and accordingly SEG-CLT/CLT tapers may provide short transitions at the crossing as well.

Within silicon microphotonics, optical interconnection almost exclusively occurs in plane, since Si microphotonics are based on the low-loss Si layer of an SOI substrate. As optical devices and interconnection becomes denser it becomes necessary to build efficient cross links in order to transport an optical signal across another optical signal. Currently, this is achieved through X-crossings or directional couplers. However, in many instances an optical waveguide must cross multiple waveguides to achieve the desired circuit layout which requires multiple waveguide crossings or multiple directional couplers which also move the intermediate optical signals to different optical waveguides. In contrast, the inventors have demonstrated the use of waveguide tapers, e.g. CLT tapers, to achieve optical coupling over larger distances between two optical waveguides than previously achieved. Further this optical coupling between the optical waveguides can be achieved over an intermediate optical waveguide or waveguides without physically crossing the waveguides or using multiple directional couplers.

Figure 17:
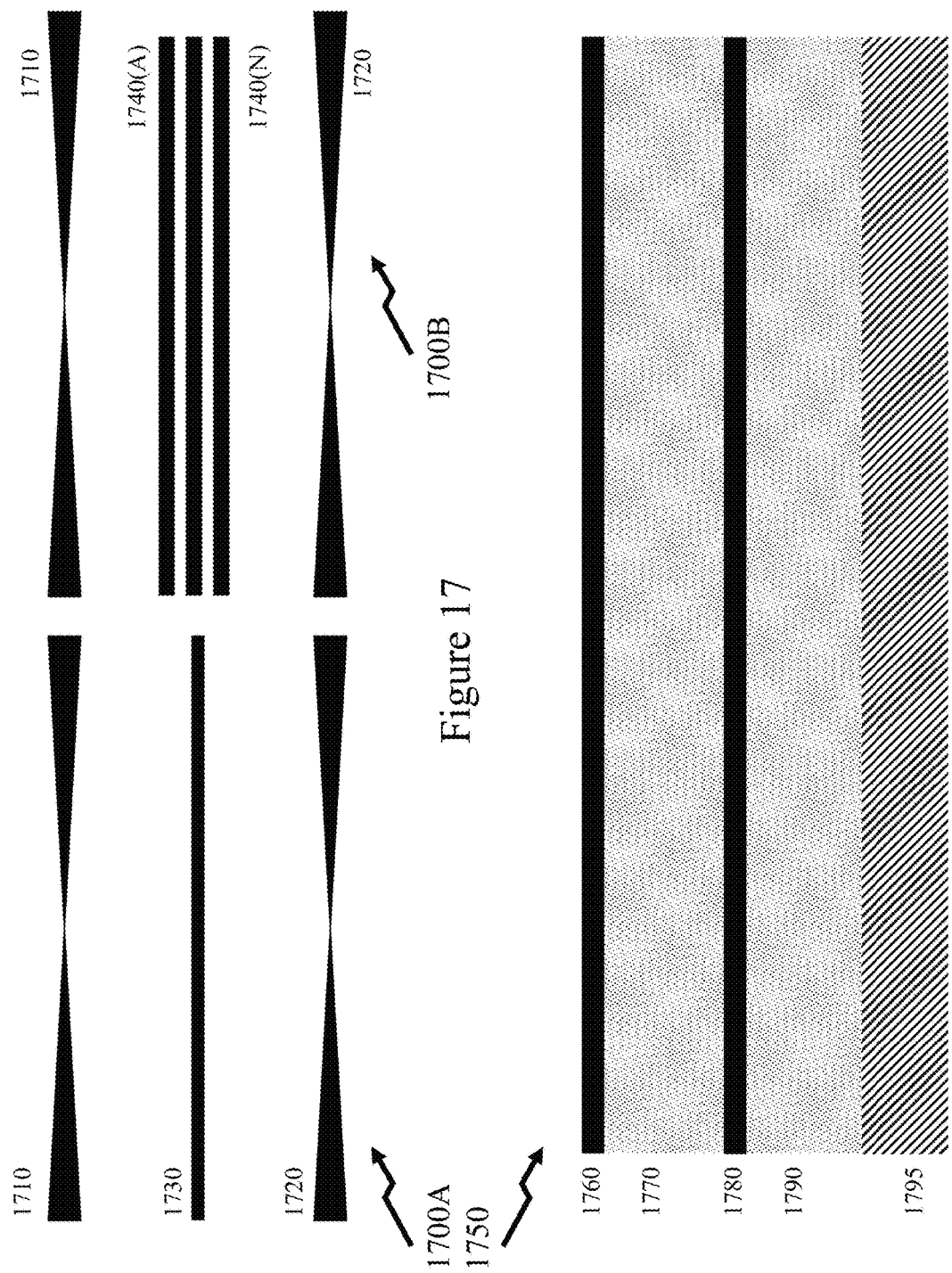
FIG. 17 depicts the exploitation of waveguide tapers for optical routing between optical waveguides with or without intermedia waveguides absent waveguide crossings and/or directional couplers.

Referring to FIG. 17 with first and second schematics 1700A and 1700B then the waveguide tapers are exploited within the first waveguide 1710 and second waveguide 1720 wherein it is sought to couple from the first waveguide 1710 to the second waveguide 1720 and/or vice-versa. As, by tapering the waveguide, we are able to expand the effective mode area of the guided mode by up to 3 orders of magnitude then we can enable the optical modes of the coupled lines to strongly overlap despite the large separating distance. Moreover, by having the tapers of both coupled lines aligned we keep the optical modes phase matched, which could result in near 100% of coupling efficiency. However, these large effective modes will only couple minimally to a central waveguide 1730 or waveguides 1740(A) to 1740(N) in the center since the effective mode area of the center waveguide is so tightly confined and can be designed such that it is not phase matched. Further, as depicted in third schematic 1750 this coupling can be employed to couple between an upper waveguide 1760 and lower waveguide 1780 and/or vice-versa through the intermediate lower cladding 1770 of the multiple stack waveguide geometry. The lower waveguide 1780 having also a lower cladding 1790 between it and the substrate 1795. As depicted in third schematic 1750 the upper and lower waveguides 1760 and 1780 are depicted with uniform thickness as the tapers are implemented within their width. However, in other embodiments of the invention the waveguide thickness and/or composition may be varied discretely or in combination with lateral waveguide geometry variations.

Within many optical circuits it is important that the circuit have equal TE and TM polarization dispersion and/or performance at least in part or fully. However, this is difficult to achieve in many instances as TE and TM polarized light travel at different velocities within the waveguide and is seen within Si microphotonic waveguides as well as those in compound semiconductors, ferroelectrics, etc. However, the inventors have established that it is possible to engineer a dispersionless taper. For example, within a SOI waveguide when the width (w) of the on-chip waveguide is smaller than the thickness of the SOI ($h_{SOI}$), i.e. w<$h_{SOI}$, then the effective index of the TM mode is larger than the TE mode. However, when w>$h_{SOI}$ the effective index of the TE mode is then larger than the TM. Thus, by carefully engineering the shape of a taper that spans waveguide widths that are both smaller and larger than $h_{SOI}$ it is possible to engineer the taper in such a manner that the TE and TM modes exit the taper phase matched or with a predetermined phase shift that counters the phase shift introduced by a following polarisation splitter/rotator or any other TE/TM phase shifting element.

Figure 18:
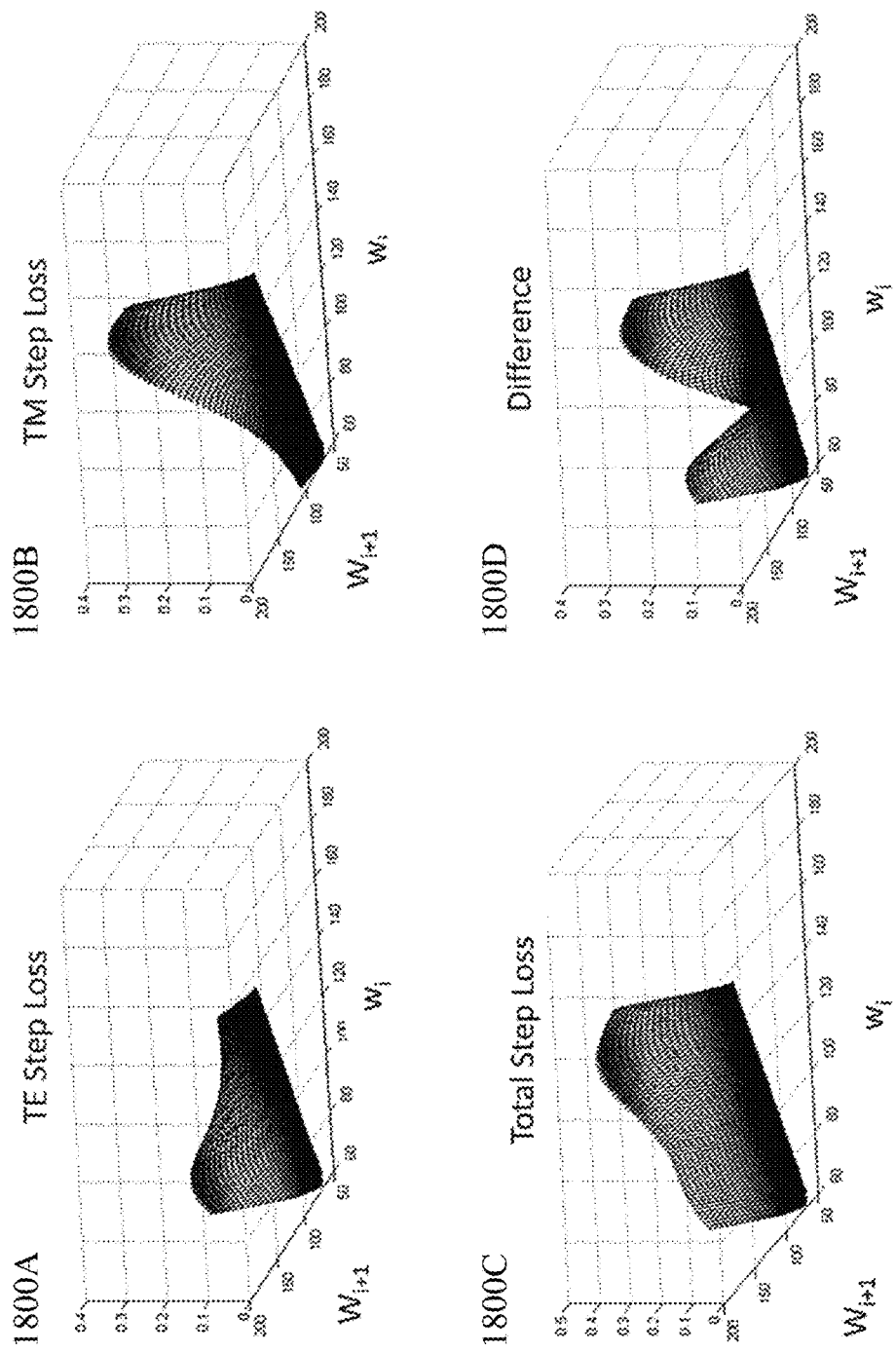
FIG. 18 depicts TE and TM loss surfaces for varying $w_i$ versus $w_{i+1}$ together with total loss and loss difference which may employed in establishing low polarization dependent tapers according to embodiments of the invention.

However, in addition to the phase matching it is important that the TE and TM losses are also balanced for ensuring polarisation independent performance. Accordingly, referring to FIG. 18 there are depicted in first and second graphs 1800A and 1800B the TE and TM step losses are presented as calculated using the overlap integral of the electromagnetic fields between the fiber and the SOI waveguide at the tip of the taper, and the efficiency of the mode conversion process between the taper tip and the interconnecting waveguide. Basically, these are the losses (z-axis) as a function of the width ($w_i$) in nm and the difference in the width ($w_{i+1}$) in nm. For example, in the TE step losses, a taper of initial width $w_i$=60 nm, is to change by 10 nm then the loss that would incurred would be that value on the surface for $w_i$=60 nm and $w_{i+1}$=70 nm. As evident from first and second graphs 1800A and 1800B the TE losses are higher for the lower widths whilst the TM losses are higher for larger widths. This is also evident in fourth graph 1800D where the difference between TE and TM losses is plotted. Third graph 1800C depicts the total step loss.

Accordingly, in order to design a low-loss dispersionless taper, i.e. total TE losses=total TM losses, then the taper shape should be established such that when the total TE and total TM losses are calculated they are equal. As such this means limiting designs to taper shapes in which the TE and TM losses are approximately equal and then choosing those taper shapes which have a low total loss. One method to achieving such a design goal would be to use a Monte Carlo approach to generate different taper shapes which will traverse the TE/TM curves such as depicted in first and second graphs 1800A and 1800B in FIG. 18 and keep those taper profiles which have a low loss and have approximately equal TE and TM losses. It would be evident that other computational algorithms exploiting repeated random sampling may be employed to perform the optimization process.

It would be evident to one skilled in the art that embodiments of the invention may be derived from an iterative design and simulation process wherein an initial design is iterated in a number of segments and/or loss per segment and/or width variation per segment until a constant loss per segment transition is achieved within a predetermined tolerance.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A waveguide comprising:
   an input waveguide having a first predetermined width and being configured for coupling to a single-mode optical fiber;
   an output waveguide having a second predetermined width; and
   an optical waveguide taper increasing in width from the first predetermined width to the second predetermined width, the optical waveguide taper decreasing an effective mode area from the input waveguide to the output waveguide, the input waveguide, the output waveguide and the optical waveguide taper being single-mode and having a uniform thickness, wherein an optical loss versus propagation distance from the first predetermined width to the second predetermined width of the optical waveguide taper is approximately constant, the optical waveguide taper comprising a number of waveguide segments of incrementally increasing width from the first predetermined width to the second predetermined width, the waveguide segments contacting each other, each waveguide segment having a given length and a given width along its corresponding length.

2. The waveguide according to claim 1, wherein an incremental loss between each consecutive pair of waveguide segments is approximately constant.

3. The waveguide according to claim 1, wherein a length of each waveguide segment is constant.

4. A device comprising:
   a silicon-on-insulator (SOI) optical waveguide comprising an input of a first predetermined width and an output of a second predetermined width, the input being configured for coupling to a single-mode optical fiber, wherein the SOI optical waveguide increasing in width according to a predetermined profile between the input and the output and decreasing an effective mode area from the input to the output, the SOI optical waveguide being single-mode from the input to the output and having a uniform thickness, an optical loss versus propagation distance from the first predetermined width to the second predetermined width of the predetermined profile is approximately constant, the predetermined profile comprising a number of waveguide segments of incremental increasing width from the first predetermined width to the second predetermined width, each of the waveguide segments having a given length and a given width along its corresponding length, the waveguide of segments contacting each other; and an incremental loss between each consecutive pair of waveguide segments being approximately constant.

5. The device according to claim 4, wherein
   the SOI optical waveguide supports transverse electric (TM) optical signals within a predetermined wavelength range;
   the first predetermined width is approximately 155 nm; and
   the second predetermined width is approximately 220 nm.

6. The device according to claim 4, wherein
   the SOI optical waveguide supports transverse magnetic (TM) optical signals within a predetermined wavelength range;
   the first predetermined width is approximately 100 nm; and
   the second predetermined width is approximately 220 nm.

7. The device according to claim 4, wherein
   the predetermined profile is a taper from the first predetermined width to the second predetermined width wherein an optical loss versus propagation distance along the taper is approximately constant.

* * * * *